(12) United States Patent
Yoon et al.

(10) Patent No.: US 9,176,861 B2
(45) Date of Patent: Nov. 3, 2015

(54) SYSTEM INCLUDING DATA STORAGE DEVICE, AND DATA STORAGE DEVICE INCLUDING FIRST AND SECOND MEMORY REGIONS

(75) Inventors: Sangyong Yoon, Seoul (KR); Seongsik Hwang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 13/339,445

(22) Filed: Dec. 29, 2011

(65) Prior Publication Data

US 2012/0173800 A1  Jul. 5, 2012

(30) Foreign Application Priority Data

Dec. 29, 2010  (KR) ........................ 10-2010-0138076

(51) Int. Cl.
  *G06F 13/00* (2006.01)
  *G06F 3/038* (2013.01)
  *G06F 12/02* (2006.01)

(52) U.S. Cl.
  CPC .... *G06F 12/0246* (2013.01); *G06F 2212/7203* (2013.01)

(58) Field of Classification Search
  CPC ... G06F 9/3885; G06F 9/3879; G06F 9/3897; G06F 2212/1028; G06F 12/1027; G06F 12/0246; G06F 2212/7203; G06F 11/1072; G06F 11/141; G06F 11/1415; G06F 11/1458; G06F 2212/2022; G06F 2212/1044; G06F 9/544; G06F 2212/214; G06F 3/0608; G06F 3/0656
  See application file for complete search history.

(56) References Cited

U.S. PATENT DOCUMENTS

| | | | |
|---|---|---|---|
| 7,130,210 B2 | 10/2006 | Bathul et al. | |
| 7,257,032 B2 | 8/2007 | Fujiu et al. | |
| 7,496,966 B1 * | 2/2009 | McGrath et al. | 726/27 |
| 7,734,861 B2 * | 6/2010 | Li et al. | 711/103 |
| 2007/0285980 A1 | 12/2007 | Shimizu et al. | |
| 2010/0262750 A1 * | 10/2010 | Deshpande et al. | 711/3 |
| 2010/0274950 A1 * | 10/2010 | Yano et al. | 711/103 |
| 2010/0318729 A1 * | 12/2010 | Himeno | 711/103 |
| 2011/0040930 A1 * | 2/2011 | Shin et al. | 711/103 |

FOREIGN PATENT DOCUMENTS

| | | |
|---|---|---|
| JP | 2006-228394 | 8/2006 |
| JP | 2007-305210 | 11/2007 |
| JP | 2008527611 | 7/2008 |
| KR | 10-2006-0052627 A | 5/2006 |
| KR | 10-2007-0109885 A | 11/2007 |
| KR | 10-0917690 B1 | 9/2009 |

\* cited by examiner

*Primary Examiner* — Cheng-Yuan Tseng
*Assistant Examiner* — Candice Rankin
(74) *Attorney, Agent, or Firm* — Volentine & Whitt, PLLC

(57) ABSTRACT

A data storage device includes a non-volatile memory device including a memory cell array, where the memory cell array includes a first region and a second region, and a memory controller configured to judge whether a size of data externally provided according to a write request exceeds a reference size, and to control the non-volatile memory device according to a judgment result. When the externally provided data exceeds the reference size, the memory controller controls the non-volatile memory device such that a portion of the externally provided data is stored in the second region via a main program operation and such that a remainder of the externally provided data is stored in the first region via a buffer program operation.

18 Claims, 35 Drawing Sheets

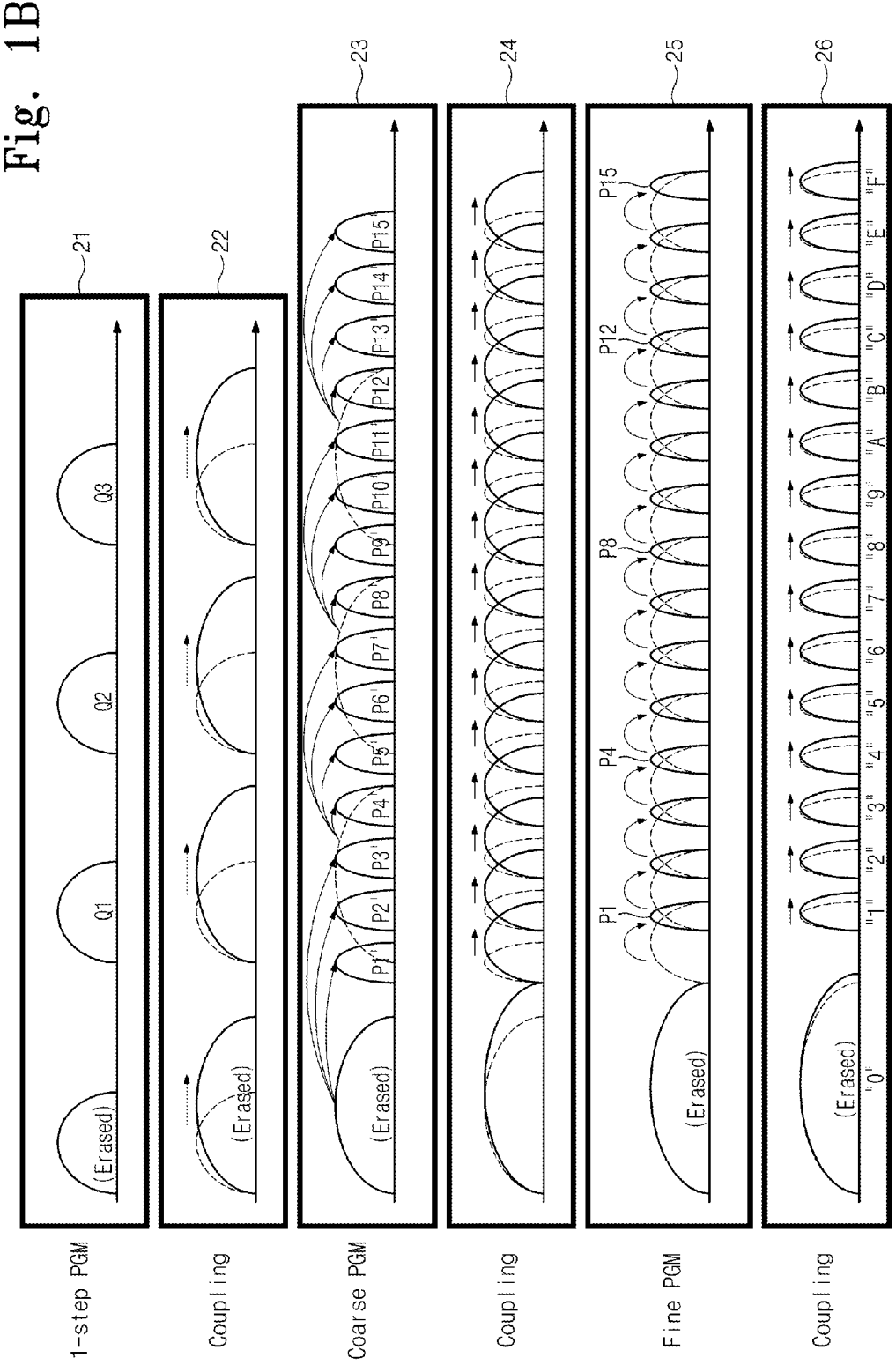

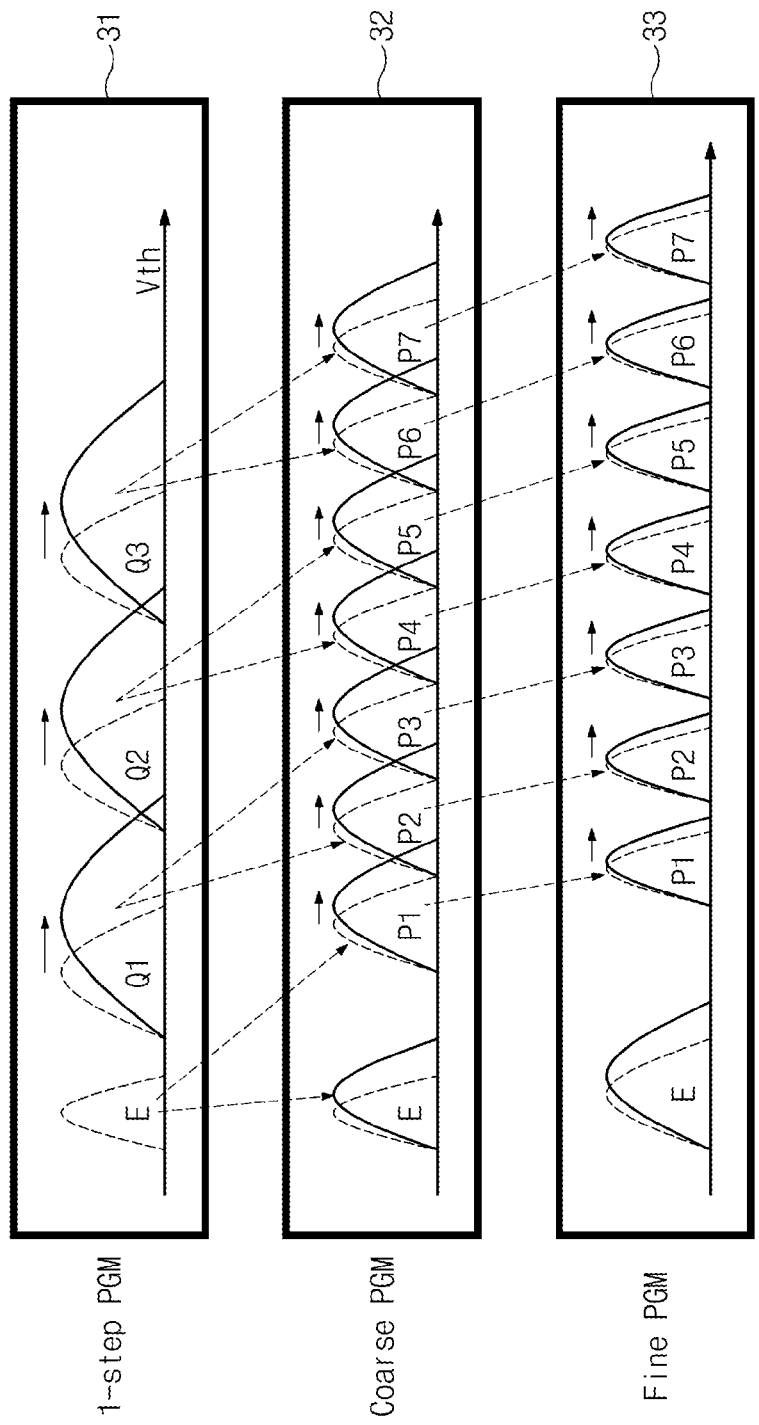

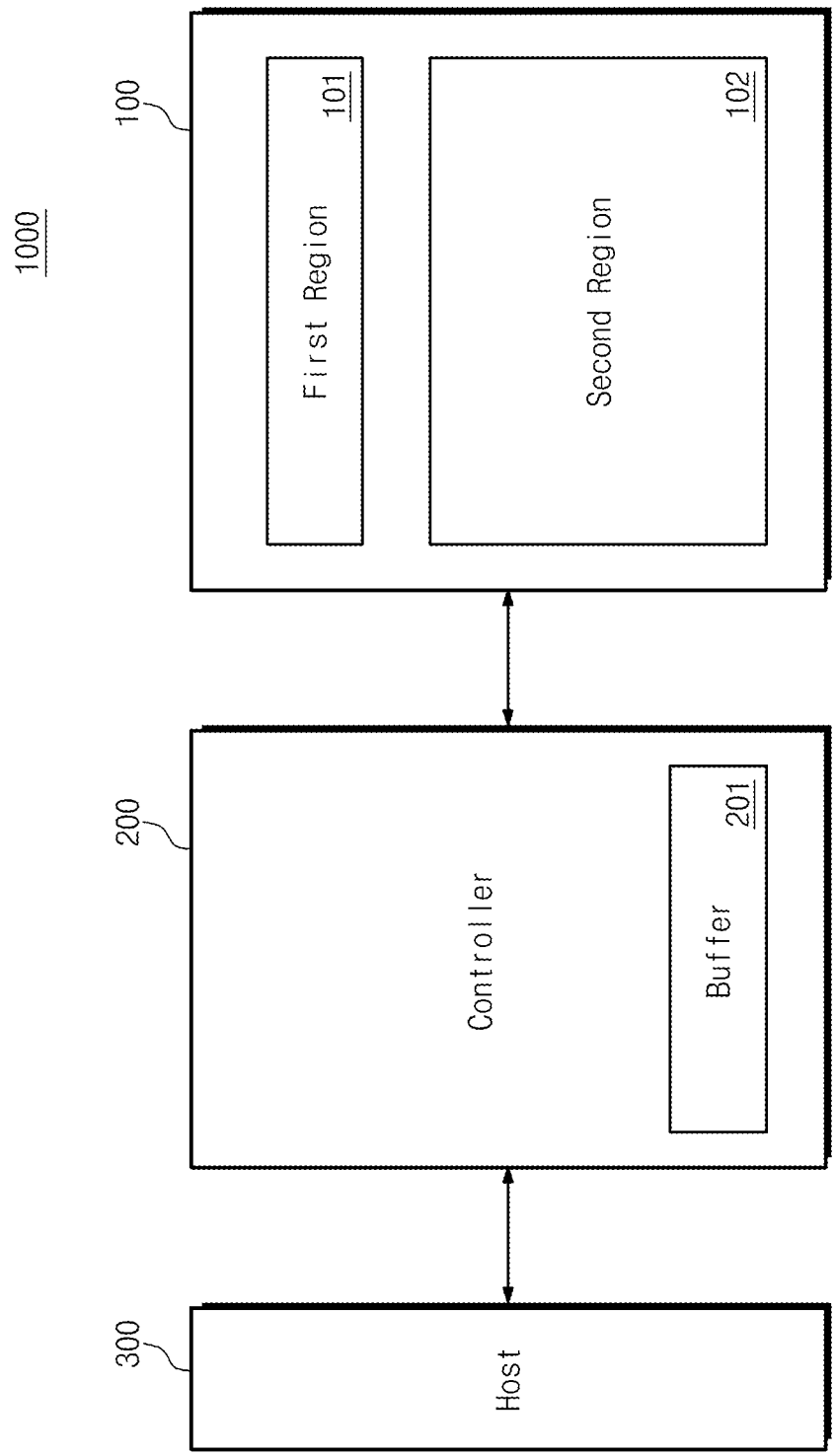

Fig. 3

| WL | 1st | CRS | FIN |
|----|-----|-----|-----|
| 63 | 250,251 | 254,255 | |
| 62 | 246,247 | 252,253 | |
| 61 | 242,243 | 248,249 | |
| ⋮ | ⋮ | ⋮ | ⋮ |
| 3 | 10,11 | 16,17 | |
| 2 | 6,7 | 12,13 | |
| 1 | 2,3 | 8,9 | |
| 0 | 0,1 | 4,5 | |

- 1st: 1st Step (4-Level)
- CRS: Coarse PGM (16-Level)
- FIN: Fine PGM (16-Level)

Fig. 9

| WL | 1st | CRS | FIN |
|----|---------|-----|-----|
| 63 | 188,189 | 191 |     |
| 62 | 185,186 | 190 |     |
| 61 | 182,183 | 187 |     |
| ⋮  | ⋮       | ⋮   | ⋮   |
| 3  | 8,9     | 13  |     |
| 2  | 5,6     | 10  |     |
| 1  | 2,3     | 7   |     |
| 0  | 0,1     | 4   |     |

- 1st: $1^{st}$ Step(4-Level)
- CRS: Coarse PGM
- FIN: Fine PGM

Fig. 13

| WL | 1st | CRS | FIN |
|---|---|---|---|
| 63 | 186,189 | 191 | |
| 62 | 183,187 | 190 | |
| 61 | 180,184 | 188 | |
| ⋮ | ⋮ | ⋮ | ⋮ |
| 3 | 6,10 | 14 | |
| 2 | 3,7 | 11 | |
| 1 | 1,4 | 8 | |
| 0 | 0,2 | 5 | |

· 1st: 1st Step (4-Level)
· CRS: Coarse PGM (8-Level)
· FIN: Fine PGM (8-Level)

Fig. 16

| WL | 1st | CRS | FIN |
|---|---|---|---|
| 63 | 246,250 | 253,255 | |
| 62 | 242,247 | 251,254 | |
| 61 | 238,243 | 248,252 | |
| 60 | 234,239 | 244,249 | |
| 59 | 230,235 | 240,245 | |
| 58 | 226,231 | 236,241 | |
| ⋮ | ⋮ | ⋮ | ⋮ |
| 5 | 14,19 | 24,29 | |
| 4 | 10,15 | 20,25 | |
| 3 | 6,11 | 16,21 | |
| 2 | 3,7 | 12,17 | |
| 1 | 1,4 | 8,13 | |
| 0 | 0,2 | 5,9 | |

- 1st: $1^{st}$ Step (4-Level)
- CRS: Coarse PGM (16-Level)
- FIN: Fine PGM (16-Level)

SYSTEM INCLUDING DATA STORAGE DEVICE, AND DATA STORAGE DEVICE INCLUDING FIRST AND SECOND MEMORY REGIONS

CROSS-REFERENCE TO RELATED APPLICATIONS

A claim of priority under 35 U.S.C. §119 is made to Korean Patent Application No. 10-2010-0138076, filed Dec. 29, 2010, the entirety of which is incorporated by reference herein.

BACKGROUND

Exemplary embodiments relate to a data storage system, and more particularly, exemplary embodiments relate to a data storage system including non-volatile memory and to a method of operating a data storage system.

Semiconductor memory devices are a vital microelectronic component commonly found in digital logic systems, such as computers, and microprocessor-based applications ranging from satellites to consumer electronics. Therefore, advances in the fabrication of semiconductor memory devices, including process enhancements and circuit-design-related developments that allow scaling to higher memory densities and faster operating speeds, help establish performance standards for other digital logic families.

Semiconductor memory devices generally include volatile memory devices, such as random access memory (RAM) devices, and nonvolatile memory devices. In RAM devices, data is stored by either establishing the logic state of a bistable flip-flop such as in a static random access memory (SRAM), or by charging a capacitor in a dynamic random access memory (DRAM). In both SRAM and DRAM devices, data remains stored and may be read as long as the power is applied, but data is lost when the power is turned off.

Mask read-only memory (MROM), programmable read-only memory (PROM), erasable programmable read-only memory (EPROM) nonvolatile memory electrically erasable programmable read-only memory (EEPROM) devices are capable of storing the data, even with the power turned off. The non-volatile memory data storage state may be permanent or reprogrammable, depending upon the fabrication technology used. Non-volatile semiconductor memories are used for store program and microcode storage in a wide variety of applications in the computer, avionics, telecommunications, and consumer electronics industries. A combination of single-chip volatile as well as non-volatile memory storage modes is also available in devices such as non-volatile SRAM (nvRAM) for use in systems that require fast, reprogrammable non-volatile memory. In addition, dozens of special memory architectures have evolved which contain some additional logic circuitry to optimize their performance for application-specific tasks.

Mask read-only memory (MROM), programmable read-only memory (PROM) and erasable programmable read-only memory (EPROM) nonvolatile memory devices are not free to erase and write on a system level, so it is not easy to update the contents of such memory. On the other hand, electrically erasable programmable read-only memory (EEPROM) non-volatile memory devices are electrically erasable and writable, and may, thus, be readily applied to auxiliary memories or system programming memories that require continuous update.

SUMMARY

One aspect of embodiments of the inventive concept is directed to a data storage device which includes a non-volatile memory device including a memory cell array, where the memory cell array includes a first region and a second region, and a memory controller configured to judge whether a size of data externally provided according to a write request exceeds a reference size, and to control the non-volatile memory device according to a judgment result. When the externally provided data exceeds the reference size, the memory controller controls the non-volatile memory device such that a portion of the externally provided data is stored in the second region via a main program operation and such that a remainder of the externally provided data is stored in the first region via a buffer program operation.

Another aspect of embodiments of the inventive concept is directed to a data storage device which includes a non-volatile memory device including a memory cell array, where the memory cell array includes a first region and a second region, and a memory controller configured to judge whether a size of data externally provided according to a write request exceeds a reference size, and to control the non-volatile memory device according to the judgment result. When the externally provided data does not exceed the reference size, the memory controller controls the non-volatile memory device such that the externally provided data is stored in the first region via a buffer program operation. When the externally provided data exceeds the reference size, the memory controller controls the non-volatile memory device such that the externally provided data is stored in the second region via a main program operation.

Yet another aspect of embodiments of the inventive concept is directed to a memory system includes a host device and a data storage device operatively coupled to the processor. The data storage device includes a non-volatile memory device including a memory cell array, where the memory cell array includes a first region and a second region, and a memory controller configured to judge whether a size of data externally provided from the host according to a write request exceeds a reference size, and to control the non-volatile memory device according to a judgment result. When the externally provided data exceeds the reference size, the memory controller controls the non-volatile memory device such that a portion of the externally provided data is stored in the second region via a main program operation and such that a remainder of the externally provided data is stored in the first region via a buffer program operation.

BRIEF DESCRIPTION OF THE FIGURES

The above and other objects and features of the inventive concept will become apparent from the following description with reference to the accompanying figures, wherein like reference numerals refer to like parts throughout the various figures unless otherwise specified.

FIG. 1B is a diagram showing a variation in threshold voltage distributions when a 3-step programming is carried out to store 4-bit data in each memory cell.

FIG. 1C is a diagram showing a variation in threshold voltage distributions when a 3-step programming operation is carried out to store 3-bit data in each memory cell.

FIG. 2 is a block diagram showing a data storage system according to an exemplary embodiment of the inventive concept.

FIG. 3 is a diagram showing an exemplary address scramble technique of a multi-bit memory device which stores 4-bit data per cell and to which a 3-step reprogram method is applied.

FIG. 9 is a diagram showing an exemplary address scramble technique of a multi-bit memory device which stores 3-bit data per cell and to which a 3-step reprogram method is applied.

FIG. 13 is a diagram showing an exemplary address scramble technique of a multi-bit memory device which stores 3-bit data per cell and to which a 3-step reprogram method is applied.

FIG. 16 is a diagram showing another address scramble technique of a multi-bit memory device in which 4-bit data is stored in a memory cell and a reprogram method is used.

DETAILED DESCRIPTION

Figure 1A:
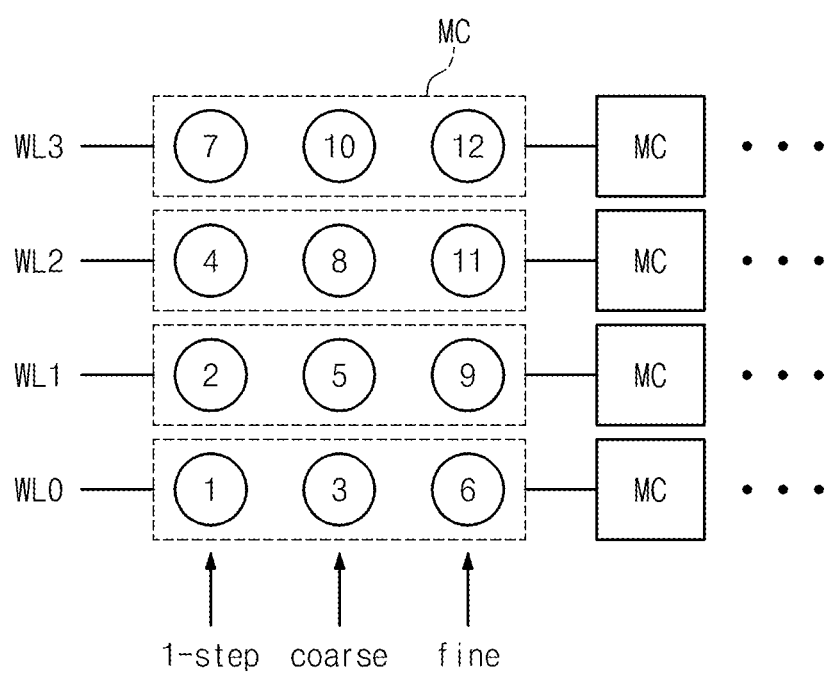
FIG. 1A a diagram showing an example of an address scramble technique applied to a multi-level memory device according to an exemplary embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

With an increase in the number of data bits stored in each memory cell, it is increasingly difficult to secure the reliability of a memory device storing multi-bit (or, multi-level) data, which is called a multi-level memory device, hereinafter. A representative one of factors causing degradation of the reliability may be a variation of threshold voltages due to the coupling between adjacent memory cells. For example, a threshold voltage of a previously programmed memory cell may be varied due to the coupling caused when a memory cell adjacent to a programmed memory cell is programmed. In FIG. 1A, there is illustrated an example of an address scramble technique applied to a multi-level memory device in order to manage the effects of coupling.

An address scramble technique will be described under the assumption that 4-bit data is stored in one memory cell. For ease of illustration, in FIG. 1A, there are illustrated only four word lines WL0 to WL3. A plurality of memory cells MC is connected with each word line. First of all, there is performed a 1-step program operation in which lower 2-bit data is stored to each memory cell in the first word line WL0. That is, during the 1-step program operation, 2-page data is stored in the memory cells connected with the first word line WL0. This is denoted as ① in FIG. 1A. Then, a 1-step program operation is executed with respect to memory cells connected with the second word line WL1. This is denoted as ② in FIG. 1A. After the 1-step program operation is performed with respect to memory cells connected with the second word line WL1, a coarse program operation (or, a 2-step program operation) is made with respect to the first word line WL0 which is placed below the second word line WL1 and in which lower 2-bit data is programmed. This is denoted as ③ in FIG. 1A. During the coarse program operation, upper 2-bit data is stored in memory cells connected with the first word line WL0. Following the coarse program operation of memory cells connected with the first word line WL0, the 1-step program operation is executed with respect to the third word line WL2. This is denoted as ④ in FIG. 1A. After the 1-step program operation for the third word line WL2, there is executed the coarse program operation during which upper 2-bit data is stored in memory cells connected with the second word line WL1. This is denoted as ⑤ in FIG. 1A. Following the coarse program operation for the second word line WL1, a fine program operation is executed with respect to the first word line WL0. This is denoted as ⑥ in FIG. 1A. Afterwards, the 1-step, coarse, and fine program operations are performed sequentially according to the above-described program order represented by the circled-numbers of FIG. 1A. A manner in which word lines are selected according to the program order described in FIG. 1A is referred to herein as an address scramble technique.

When the 1-step program operation and the coarse program operation are completed, threshold voltage distributions (for example, $2^M$ threshold voltage distributions) corresponding to M-bit data (M being 2 or more integer) are all formed. Although all threshold voltage distributions are formed upon completion of the coarse program operation, margins between threshold voltage distributions are insufficient to reliably distinguish threshold voltage distributions. The fine program operation is carried out to secure margins sufficient to adequately distinguish threshold voltage distributions. The fine program operation is executed to narrow a width of each threshold voltage distribution. During the fine program operation, verify voltages are used which are higher by a predetermine voltage than verify voltages of threshold voltage distributions used during the coarse program operation. It is possible to reduce coupling between adjacent memory cells through the above-described manner of programming, which is referred herein as a reprogram method/algorithm.

In an exemplary embodiment, the above-described reprogram method for 4-bit data, that is, the 1-step programming, coarse programming, and fine programming may be applied to a reprogram method of 2-bit data and 3-bit data.

With the reprogram method, it is necessary to retain data stored in memory cells in an arbitrary word line until there is completed the fine program operation for the arbitrary word line. For example, the 1-step program operation is carried out depending upon data provided to a multi-bit memory device from a memory controller, and the coarse program operation is executed depending upon data stored through the 1-step program operation and data provided from the memory controller. The fine program operation is executed depending upon data stored through the 1-step and coarse program operations. However, as described above, it is difficult to exactly read data stored through the 1-step and coarse program operations. This means that data necessary for the fine program operation must be provided to the multi-bit memory device from the memory controller. For this reason, the memory controller must retain the data stored in memory cells in an arbitrary word line until the fine program operation for the arbitrary word line is complete. This means that a large buffer memory is provided to the memory controller in order to retain data needed for the fine program operation.

FIG. 1B is a diagram showing a variation in threshold voltage distributions when a program operation is carried out according to 3-step programming to store 4-bit data in each memory cell. Below, a program method according to the 3-step programming will be more fully described with reference to the accompanying drawings.

Firstly, 2-page data (that is, the first and second page data) is stored in memory cells of a selected word line (for example, WL0 in FIG. 1A). At this time, as illustrated in a box 21 of FIG. 1B, memory cells in a threshold voltage distribution corresponding to an erase state E may be programmed to have threshold voltages in threshold voltage distributions each corresponding to program states Q1, Q2, and Q3, based on data to be programmed.

As described above, a coarse program operation of 1-step programmed memory cells in a word line (for example, WL0) is executed after a 1-step program operation of memory cells in an adjacent word line (for example, WL1). At this time, as illustrated in a box 22 of FIG. 1B, distributions of 1-step programmed memory cells in the word line (for example, WL0) widen due to the coupling caused when memory cells in an adjacent word line (for example, WL1) are programmed.

Then, 2-page data, that is, the third and fourth page data may be stored in memory cells of the selected word line WL0. At this time, as illustrated in a box 23 of FIG. 1B, memory cells in a threshold voltage distribution corresponding to each state may be programmed to have threshold voltages in corresponding threshold voltage distributions. For example, memory cells in a threshold voltage distribution corresponding to an erase state E may be programmed to have threshold voltages in corresponding threshold voltage distributions to program states P1' to P3', based on data to be programmed. Memory cells in a threshold voltage distribution corresponding to a program state Q1 may be programmed to have threshold voltages in corresponding threshold voltage distributions to program states P4' to P7', based on data to be programmed. Memory cells in a threshold voltage distribution corresponding to a program state Q2 may be programmed to have threshold voltages in corresponding threshold voltage distributions to program states P8' to P11', based on data to be programmed. Memory cells in a threshold voltage distribution corresponding to a program state Q3 may be programmed to have threshold voltages in corresponding threshold voltage distributions to program states P12' to P15', based on data to be programmed.

As described above, a fine program operation of coarse programmed memory cells in a word line (for example, WL0) may be executed after a 1-step program operation and a coarse program operation on adjacent word lines (for example, WL2 and WL1). At this time, as illustrated by a box 24 of FIG. 1B, distributions of coarse programmed memory cells in the word line (for example, WL0) widen due to the coupling caused when memory cells in adjacent word lines (for example, WL2 and WL1) are programmed. As described previously, it is difficult to reliably read data from coarse programmed memory cells.

Memory cells in the word line WL0 may be programmed to have final threshold voltage distributions P1 to P15 as illustrated in a box 25 of FIG. 1B. This operation is called a fine program operation. As described above, the fine program operation necessitates previously programmed data (for example, the first to fourth page data). Since it is difficult to read previously programmed data from memory cells in the word line WL0, the fine program operation will be executed based on data provided from a memory controller (or, data maintained by a memory device). As illustrated in a box 26 of FIG. 1B, distributions of fine programmed memory cells widen due to the coupling caused when memory cells in adjacent word lines are programmed.

Afterwards, a 1-step program operation, a coarse program operation, and a fine program operation on each word line will be executed according to a program order (or, sequence) described in FIG. 1A, which will be executed in the same manner as described in FIG. 1B.

FIG. 1C is a diagram showing a variation in threshold voltage distributions when a program operation is carried out according to 3-step programming to store 3-bit data in each memory cell. Below, a program method according to the 3-step programming will be more fully described with reference to the accompanying drawings.

Firstly, 2-page data (that is, the first and second page data) is stored in memory cells of a selected word line (for example, WL0 in FIG. 1A). At this time, as illustrated in a box 31 of FIG. 1C, memory cells in a threshold voltage distribution corresponding to an erase state E may be programmed to have threshold voltages in threshold voltage distributions each corresponding to program states Q1, Q2, and Q3, based on data to be programmed.

As described above, a coarse program operation of 1-step programmed memory cells in a word line (for example, WL0) is executed after a 1-step program operation of memory cells in an adjacent word line (for example, WL1). At this time, as illustrated by a solid line of a box 31 of FIG. 1C, distributions of 1-step programmed memory cells in the word line (for example, WL0) widen due to the coupling caused when memory cells in an adjacent word line (for example, WL1) are programmed.

Then, 1-page data may be stored in memory cells of the selected word line WL0. At this time, as illustrated in a box 32 of FIG. 1C, memory cells in a threshold voltage distribution corresponding to each state may be programmed to have threshold voltages in corresponding threshold voltage distributions. For example, memory cells in a threshold voltage distribution corresponding to an erase state E may be programmed to have threshold voltages in a corresponding threshold voltage distribution to a program state P1, based on data to be programmed. Memory cells in a threshold voltage distribution corresponding to a program state Q1 may be programmed to have threshold voltages in corresponding threshold voltage distributions to program states P2 and P3, based on data to be programmed. Memory cells in a threshold voltage distribution corresponding to a program state Q2 may be programmed to have threshold voltages in corresponding threshold voltage distributions to program states P4 and P5, based on data to be programmed. Memory cells in a threshold voltage distribution corresponding to a program state Q3 may be programmed to have threshold voltages in corresponding threshold voltage distributions to program states P6 to P7, based on data to be programmed.

As described above, a fine program operation of coarse programmed memory cells in a word line (for example, WL0) may be executed after a 1-step program operation and a coarse program operation on adjacent word lines (for example, WL2 and WL1). At this time, as illustrated by a solid line in a box 32 of FIG. 1C, distributions of coarse programmed memory cells in the word line (for example, WL0) widen due to the coupling caused when memory cells in adjacent word lines (for example, WL2 and WL1) are programmed. For this reason, it is difficult to reliably read data from coarse programmed memory cells.

Memory cells in the word line WL0 may be programmed to have final threshold voltage distributions P1 to P7 as illustrated in a box 33 of FIG. 1C. This operation is called a fine program operation. As described above, the fine program operation necessitates previously programmed data (for example, the first to third page data). Since it is difficult to read previously programmed data from memory cells in the word line WL0, the fine program operation will be executed based on data provided from a memory controller (or, data maintained by a memory device). As illustrated by a solid line in a box 33 of FIG. 1C, distributions of fine programmed memory cells widen due to the coupling caused when memory cells in adjacent word lines are programmed.

Afterwards, a 1-step program operation, a coarse program operation, and a fine program operation on each word line will be executed according to a program order (or, sequence)

described in FIG. 1A, which will be executed in the same manner as described in FIG. 1C.

FIG. 2 is a block diagram showing a data storage system according to an exemplary embodiment of the inventive concept.

Referring to FIG. 2, a data storage system 1000 includes a multi-bit memory device 100 as a non-volatile memory device, a memory controller 200, and a host 300. The multi-bit memory device 100 may be formed of one or more memory chips. As a data storage device, the multi-bit memory device 100 and the memory controller 200 may constitute a memory card, a Solid State Drive (SSD), a memory stick, or the like. The multi-bit memory device 100 includes a plurality of memory blocks (or, sectors/banks), each of which has memory cells arranged in rows and columns. Each of the memory cells stores multi-bit (or, multi-level) data. The memory cells are arranged in a 2-dimensional array structure and/or a 3-dimensional/vertical array structure. An exemplary 3-dimensional array structure is disclosed in U.S. Publication Nos. 2008/0023747 and 2008/0084729, the entireties of which are incorporated by reference herein.

Memory blocks of the multi-bit memory device 100 are divided into a first region 101 and a second region 102. Herein, the division of memory cell array 100 into the first and second regions 101 and 102 may be made logically, rather than physically. Also, the first and second regions 101 and 102 can be changed logically. Memory blocks in the first region 101 are programmed in a manner different from memory blocks in the second region 102. For example, memory blocks in the first region 101 are programmed according to a single-bit program operation (hereinafter, referred to as an SLC program operation), and memory blocks in the second region 102 are programmed according to a multi-bit program operation (for example, the above-described N-step reprogram operation) (hereinafter, referred to as an MLC program operation). In this example, each memory cell in the first region 101 stores 1-bit data, while each memory cell in the second region 102 stores M-bit data (M being 3 or more integer). Further, each memory cell in the first region 101 may store less data bits in number as compared with M-bit data (M being 3 or more integer) stored in each memory cell in the second region 102.

Continuing to refer to FIG. 2, the memory controller 200 is configured to control the multi-bit memory device 100 in response to a request of the host 300. The memory controller 200 may include a buffer memory 201. The buffer memory 201 is used to temporarily store data sent from the host 300 and data read out from the multi-bit memory device 100. The memory controller 200 controls a program operation of the memory device 100 in the static scheduling manner. For example, when data of the minimum program unit for the first region 101 is stored in the buffer memory 201, the memory controller 200 controls the multi-bit memory device 100 such that data of the minimum program unit is stored (or, programmed) in the first region 101. This is called a buffer program operation. If data of the minimum program unit for the second region 102 is gathered at the first region 101, the memory controller 200 controls the multi-bit memory device 100 such that data of the minimum program unit for the second region 102 is stored (or, programmed) in the second region 102. This is called a main program operation. The buffer program operation and the main program operation will be more fully described afterward.

In an exemplary embodiment, the minimum program unit for the first region 101 and the minimum program unit for the second region 102 may be determined variously depending upon a program operation, a cell-per-bit number, and the like. The minimum program unit for the first region 101 is different from the minimum program unit for the second region 102.

In an exemplary embodiment, it is possible to minimize a size of the buffer memory 201 of the memory controller 200 by storing data in the first region 101 through the buffer program operation and storing data in the second region 102 through the main program operation. In other words, it is unnecessary to retain data for a fine program operation in the buffer memory 201. Accordingly, a size of the buffer memory 201 of the memory controller 200 is reduced.

Figure 4:
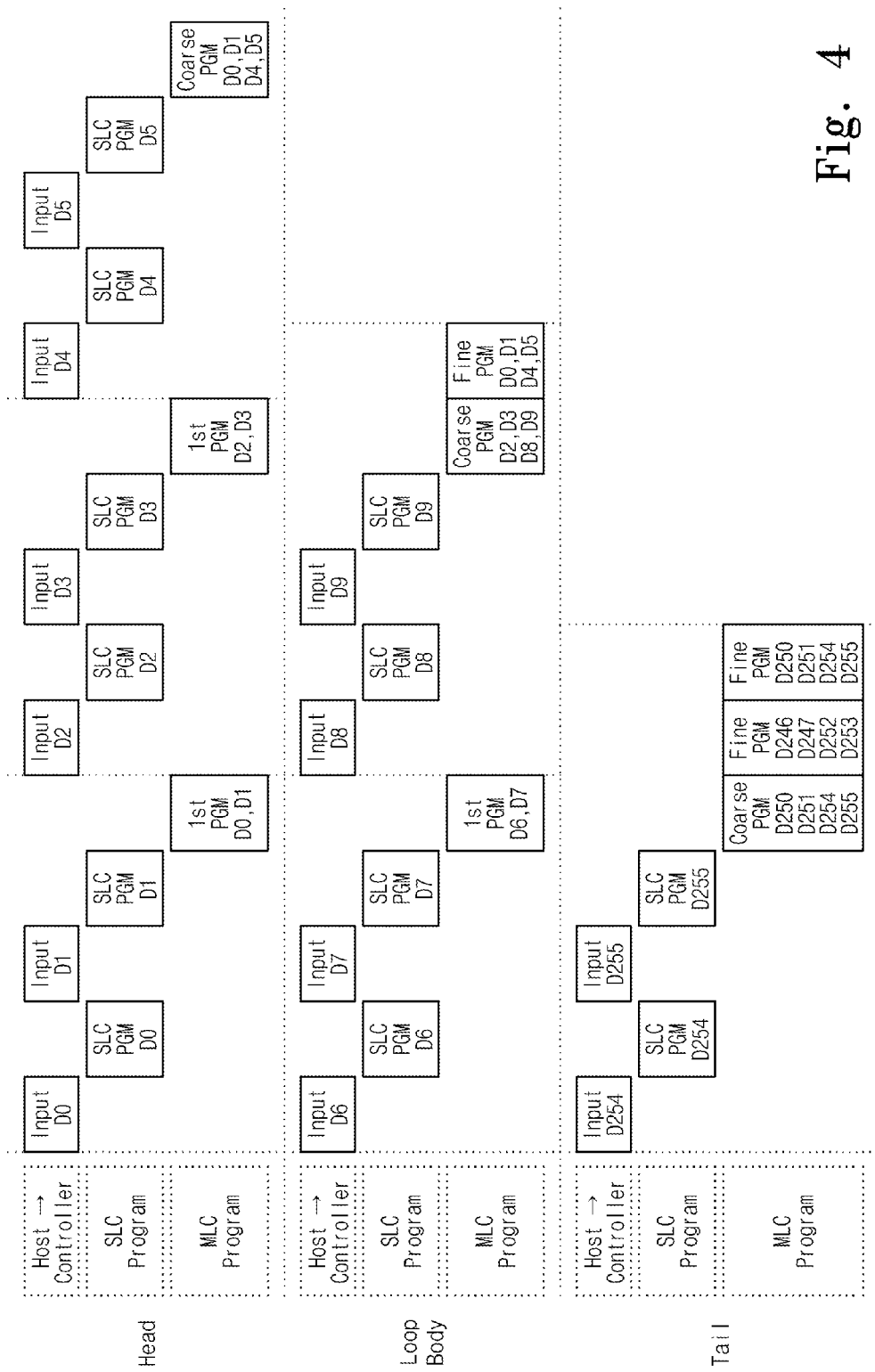
FIG. 4 is a diagram showing the flow of data during a program operation of a data storage system illustrated in FIG. 2.

FIG. 3 is a diagram showing an exemplary address scramble technique of a multi-bit memory device which stores 4-bit data per cell and to which a 3-step reprogram method is applied, and FIG. 4 is a diagram showing the flow of data during a program operation of a data storage system illustrated in FIG. 2. Below, an operation of a data storage system according to an exemplary embodiment of the inventive concept will be more fully described with reference to the accompanying drawings.

In order to simplify the description, as illustrated in FIG. 3, it is assumed that each memory block includes 64 word lines WL0 to WL63 and that each memory cell stores 4-bit data. With this assumption, 256 pages are stored in each memory block. Herein, the term "page" is used to indicate page data.

First of all, if data D0 of the minimum program unit for the first region 101 is transferred to a buffer memory 201 of a memory controller 200 from a host 300, the data D0 stored in the buffer memory 201 is programmed in the first region 101 of the multi-bit memory device 100 according to the control of the memory controller 200. As described above, the data D0 is programmed in the first region 101 through an SLC program operation. The memory controller 200 judges whether data of the minimum program unit for the second region 102 is gathered at the first region 101, and controls a main program operation according to the judgment result. Whether data of the minimum program unit for the second region 102 is gathered at the first region 101 may be judged according to a page address. Since only one page D0 is stored in the first region 101, the main program operation is not carried out. If data D1 of the minimum program unit for the first region 101 is transferred to the buffer memory 201 of the memory controller 200 from the host 300, the data D1 stored in the buffer memory 201 is programmed in the first region 101 of the multi-bit memory device 100 according to the control of the memory controller 200. Since data of the minimum program unit for the second region 102 (for example, 2-page necessary for a 1-step program operation) is gathered at the first region 101, the memory controller 200 controls the multi-bit memory device 100 such that data D0 and D1 stored in the first region 101 is stored in the second region 102. That is, the 1-step program operation for a word line WL0 is made based on the data D0 and D1 stored in the first region 101.

As described above, if data of the minimum program unit for the first region 101 is stored in the buffer memory 201, data stored in the buffer memory 201 is programmed in the first region 101 of the multi-bit memory device 100 under the control of the memory controller 200. Data is stored in the first region 101 through the SLC program operation. If data Di (i being 0 to 255) of the minimum program unit for the first region 101 is stored in the buffer memory 201, data stored in the buffer memory 201 is programmed in the first region 101 of the multi-bit memory device 100 through the SLC program operation under the control of the memory controller 200. Together with the judgment of whether data of the minimum program unit for the first region 101 is stored in the buffer memory 201, the memory controller 200 judges whether data of the minimum program unit for the second region 102 is gathered at the first region 101. The memory controller 200 may control the 1-step program operation, the coarse program operation, or the fine program operation for the second region 102, depending upon the judgment result, which will be more fully described below.

The 1-step program operation, the coarse program operation, or the fine program operation for the second region 102 may be determined in an address scramble technique illustrated in FIG. 3. For example, in the event that D0 and D1 data is stored in the first region 101, the 1-step program operation for a word line WL0 is carried out depending upon the D0 and D1 data stored in the first region 101. If D2 and D3 data is stored in the first region 101, the 1-step program operation for a word line WL1 is carried out. That is, the 1-step program operation for the word line WL1 is carried out depending upon the D2 and D3 data stored in the first region 101.

Continuously, if D4 and D5 data is stored in the first region 101, the coarse program operation for the word line WL0 is carried out depending upon the D0, D1, D4 and D5 data stored in the first region 101. When D6 and D7 data is stored in the first region 101, the 1-step program operation for the word line WL2 is carried out depending upon the D6 and D7 data stored in the first region 101. In the event that D8 and D9 data is stored in the first region 101, the coarse program operation for the word line WL1 is carried out depending upon the D2, D3, D8 and D9 data stored in the first region 101. After the coarse program operation for the word line WL1 is carried out depending upon the D8 and D9 data stored in the first region 101, the fine program operation for the word line WL0 is executed depending on D0, D1, D4, and D5 data stored in the first region 101. Afterwards, before D254 data is stored in the first region 101, the remaining data D10 to D253 may be stored in the second region 102 in the same order as the 1-step program operation of D6 and D7 data, the coarse program operation of D8 and D9 data, and the fine program operation of D0, D1, D4, and D5 data.

In the case that D254 and D255 data is stored in the first region 101, the coarse program operation for the word line WL63 is carried out depending upon D254 and D255 data stored in the first region 101. After the coarse program operation for the word line WL63 is carried out depending upon D254 and D255 data stored in the first region 101, the fine program operation for the word line WL62 is executed depending upon D246, D247, D252, and D253 data stored in the first region 101. Finally, the fine program operation for the word line WL63 is executed depending upon D250, D251, D254, and D255 data stored in the first region 101.

As understood from FIG. 4, it is possible to judge an SLC program operation, a set of SLC and 1-step program operations, a set of SLC and coarse program operations, a set of SLC, coarse, and fine program operations, and a set of SLC, coarse, fine, and fine program operations, depending upon data to be stored in the first region 101, that is, a page address of data to be stored in the first region 101. The SLC program operation, the 1-step program operation, the coarse program operation, or the fine program operation, for example, may be carried out when corresponding commands are provided to the multi-bit memory device 100 from the memory controller 200. Alternatively, a command set indicating a program pattern is provided to the multi-bit memory device 100, and the multi-bit memory device 100 performs a set of operations automatically according to the command set. The program pattern is formed of an SLC program operation, a set of SLC and 1-step program operations, a set of SLC and coarse program operations, a set of SLC, coarse, and fine program operations, or a set of SLC, coarse, fine, and fine program operations. A set of program operations in a program pattern may be changed according to an address scramble technique, a cell-per-bit number, and the like. The following table 1 shows program patterns applied to a program operation described in FIGS. 3 and 4.

TABLE 1

| Program pattern | Program set |
| --- | --- |
| Pattern 1 | SLC program |
| Pattern 2 | SLC program + 1-step program |
| Pattern 3 | SLC program + coarse program |
| Pattern 4 | SLC program + coarse program + fine program |
| Pattern 5 | SLC program + coarse program + fine program + fine program |

Figure 5:
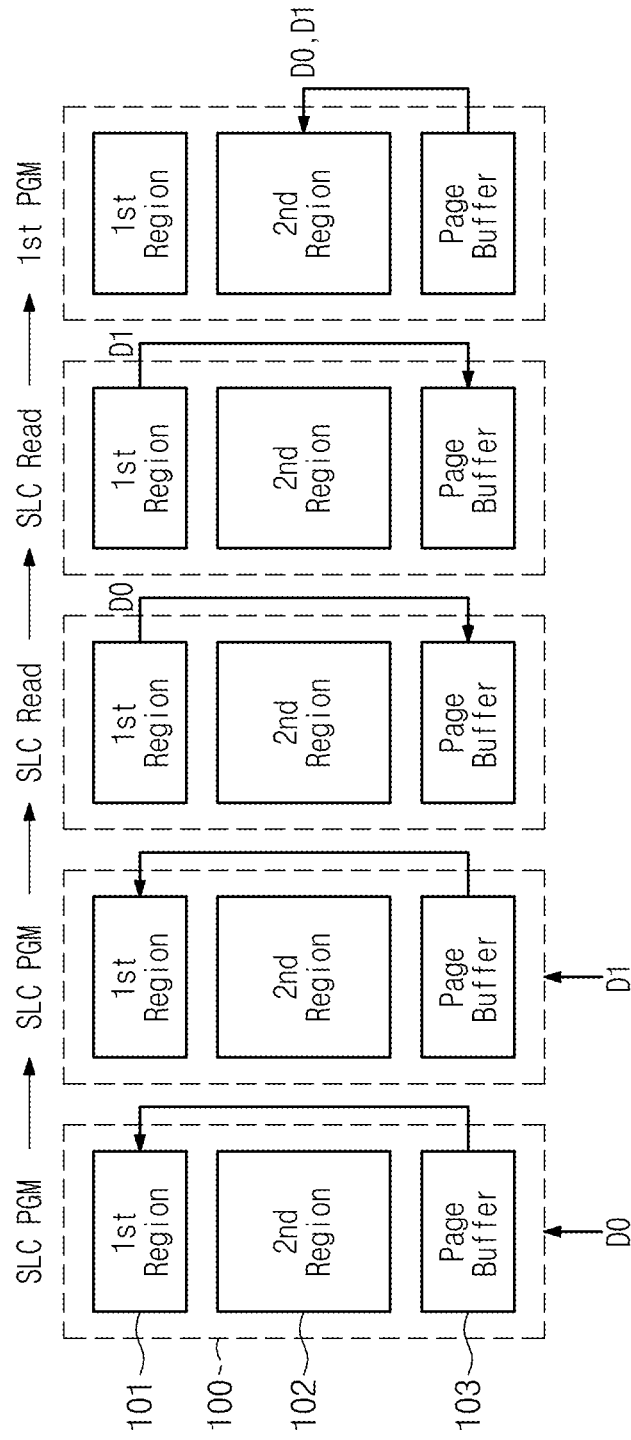
FIG. 5 is a diagram showing the flow of data according to a set of single-bit and 1-step program operations described in FIG. 4.

FIG. 5 is a diagram showing the flow of data according to a set of single-bit and 1-step program operations described in FIG. 4.

Referring to FIG. 5, data D0 is loaded onto a page buffer 103 of a multi-bit memory device 100, and the loaded data D0 is stored in the first region 101. And then, data D1 is loaded onto the page buffer 103 of the multi-bit memory device 100, and the loaded data D1 is stored in the first region 101. If the D0 and D1 data is stored in the first region 101, that is, when data (for example, 2-page) of the minimum program unit for the second region 102 is gathered at the first region 101, the D0 and D1 data is read from the first region 101 through the page buffer 103, sequentially. Afterwards, the D0 and D1 data stored in the page buffer 103 is stored in the second region 102 according to the 1-step program operation. Data transfer from the first region 101 to the page buffer 103 may be executed by the SLC read operation. A set of single/SLC read operation and 1-step program operation may be carried out automatically without intervention of the memory controller 200. In another embodiment, the single-bit read operation, the 1-step program operation, the coarse program operation, and the fine program operation may be executed according to the control of the memory controller 200. Each of the 1-step program operations illustrated in FIG. 5 is carried out substantially identically to that illustrated in FIG. 4, and a description thereof is thus omitted.

Figure 6:
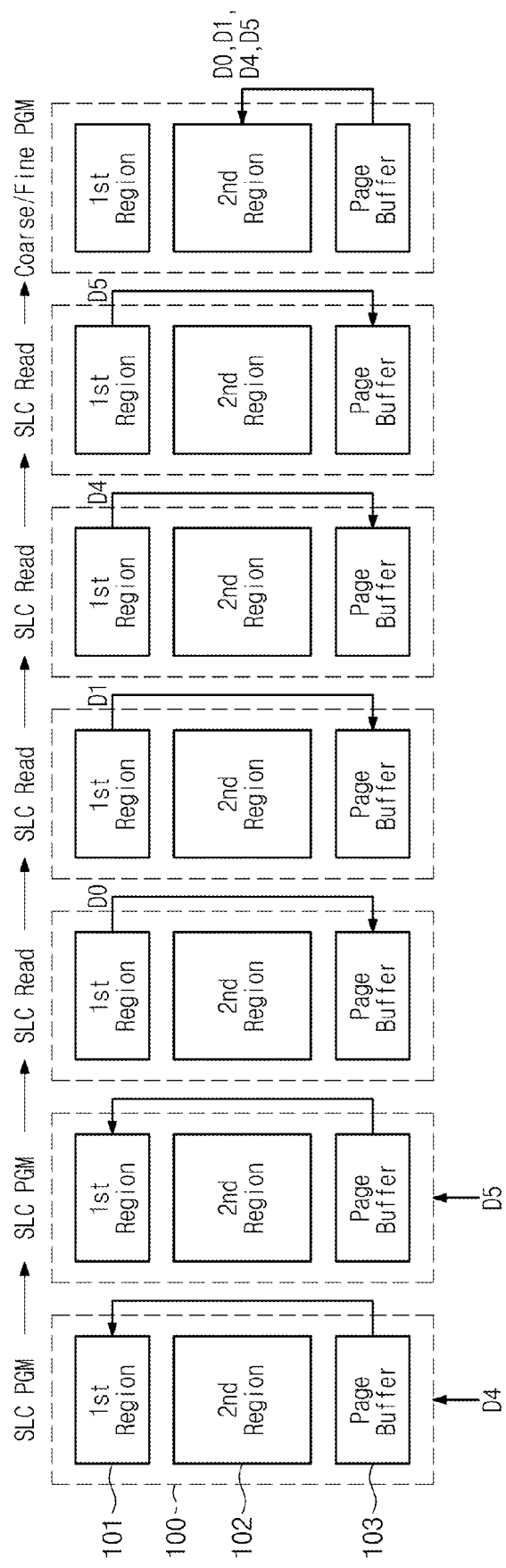
FIG. 6 is a diagram showing the flow of data according to a set of single-bit and coarse/fine program operations described in FIG. 4.

FIG. 6 is a diagram showing the flow of data according to a set of single-bit and coarse/fine program operations described in FIG. 4.

Referring to FIG. 6, data D4 is loaded onto a page buffer 103 of a multi-bit memory device 100, and the loaded data D4 is stored in the first region 101. And then, data D5 is loaded onto the page buffer 103 of the multi-bit memory device 100, and the loaded data D5 is stored in the first region 101. If the D4 and D5 data is stored in the first region 101, that is, when data (for example, 2-page) of the minimum program unit for the second region 102 is gathered at the first region 101, as illustrated in FIG. 6, D0, D1, D4, and D5 data is read from the first region 101 through the page buffer 103 according to the SLC read operation, sequentially. Afterwards, the D0, D1, D4, and D5 data stored in the page buffer 103 is stored in the second region 102 through the coarse program operation. A set of single/SLC read operation and coarse program operation may be carried out automatically without intervention of the memory controller 200. In another embodiment, the single-bit read operation, the 1-step program operation, the coarse program operation, and the fine program operation may be executed according to the control of the memory controller 200. The coarse program operations illustrated in FIG. 6 is carried out substantially identically to that illustrated in FIG. 4, and a description thereof is thus omitted.

The fine program operation may be carried out in the same manner as the coarse program operation. For example, the fine program operation for a word line WL0 is accomplished by transferring D0, D1, D4, and D5 data of the first region 101 to the page buffer 103 sequentially and storing the D0, D1, D4, and D5 data of the page buffer 103 in the second region 102.

Figure 7:
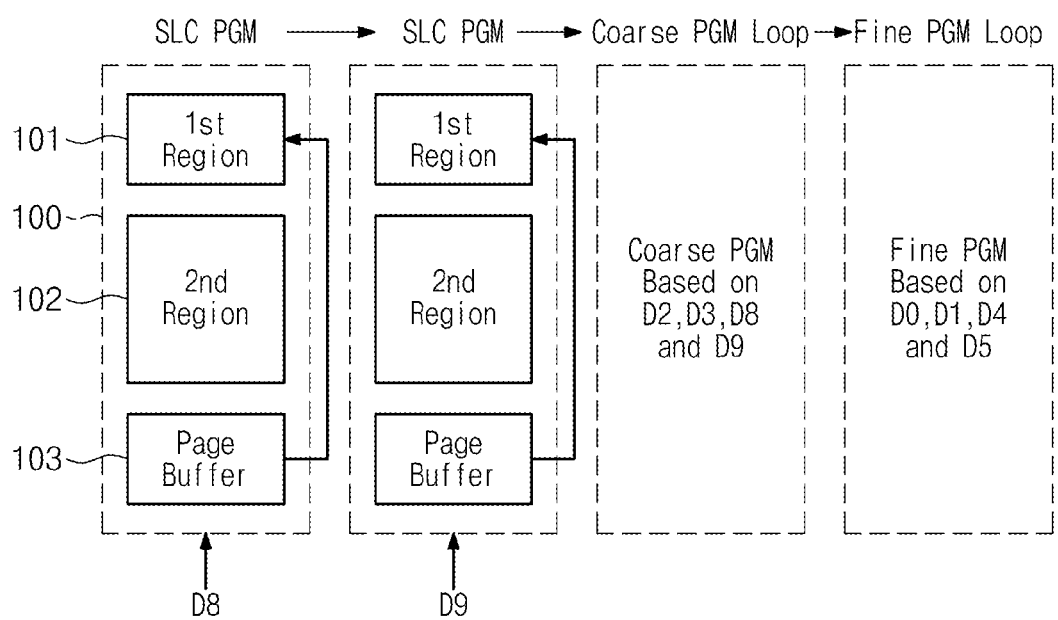
FIG. 7 is a diagram showing the flow of data according to a set of single-bit, coarse, and fine program operations described in FIG. 4.

FIG. 7 is a diagram showing the flow of data according to a set of single-bit, coarse, and fine program operations described in FIG. 4.

Referring to FIG. 7, data D8 is loaded onto a page buffer 103 of a multi-bit memory device 100, and the loaded data D8 is stored in the first region 101. And then, data D9 is loaded onto the page buffer 103 of the multi-bit memory device 100, and the loaded data D9 is stored in the first region 101. If the D8 and D9 data is stored in the first region 101, that is, when data of the minimum program unit for the second region 102 is gathered at the first region 101, the coarse program operation for a word line WL1 is performed. That is, D2, D3, D8, and D9 data is sequentially read out from the first region 101 through the page buffer 103 according to the SLC read operation. The D2, D3, D8, and D9 data in the page buffer 103 is stored in the second region 102 by the coarse program operation. After the coarse program operation for the word line WL1 is carried out, without intervention of the memory controller 200, there is executed the fine program operation for the word line WL0. That is, D0, D1, D4, and D5 data is sequentially read out from the first region 101 through the page buffer 103 according to the SLC read operation, and the D0, D1, D4, and D5 data of the page buffer 103 is stored in the second region 102 according to the fine program operation.

Figure 8:
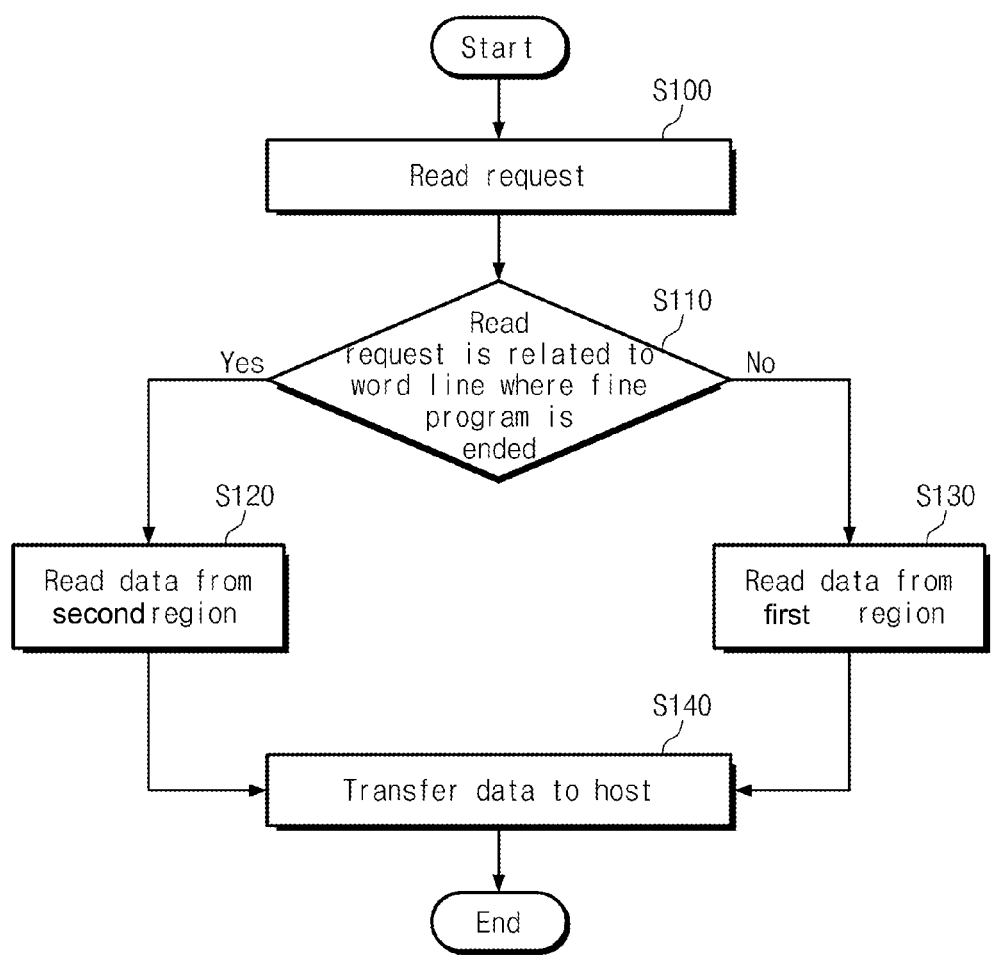
FIG. 8 is a flowchart for describing a read operation of a memory system illustrated in FIG. 2.

FIG. 8 is a flow chart for describing a read operation of a memory system illustrated in FIG. 2. Below, a read operation of a memory system according to an exemplary embodiment of the inventive concept will be more fully described with reference to the accompanying drawings.

In step S100, a read operation is requested from an external device (for example, a host). In step S110, a memory controller 200 judges whether the read request is related to a word line whose fine program operation is completed. Whether the fine program operation for each word line is completed is judged depending upon address mapping information. In the event that the read request is associated with a word line whose fine program operation is completed, in step S120, the memory controller 200 controls a multi-bit memory device 100 such that requested data is read from the second region 102 of the memory device 100. The read operation for the second region 102 is an MLC read operation. Data read from the second region 102 is temporarily stored in a buffer memory 201 of the memory controller 200. Afterwards, the procedure goes to step S140. In step S110, if the read request is associated with a word line whose fine program operation is not completed, in step S130, the memory controller 200 controls the multi-bit memory device 100 such that requested data is read from the first region 101. The read operation for the first region 101 is an SLC read operation. Data read from the first region 101 is temporarily stored in the buffer memory 201 of the memory controller 200. Afterwards, the procedure goes to step S140, in which data stored in the buffer memory 201 is sent to the external device, that is, the host 300.

Figure 10:
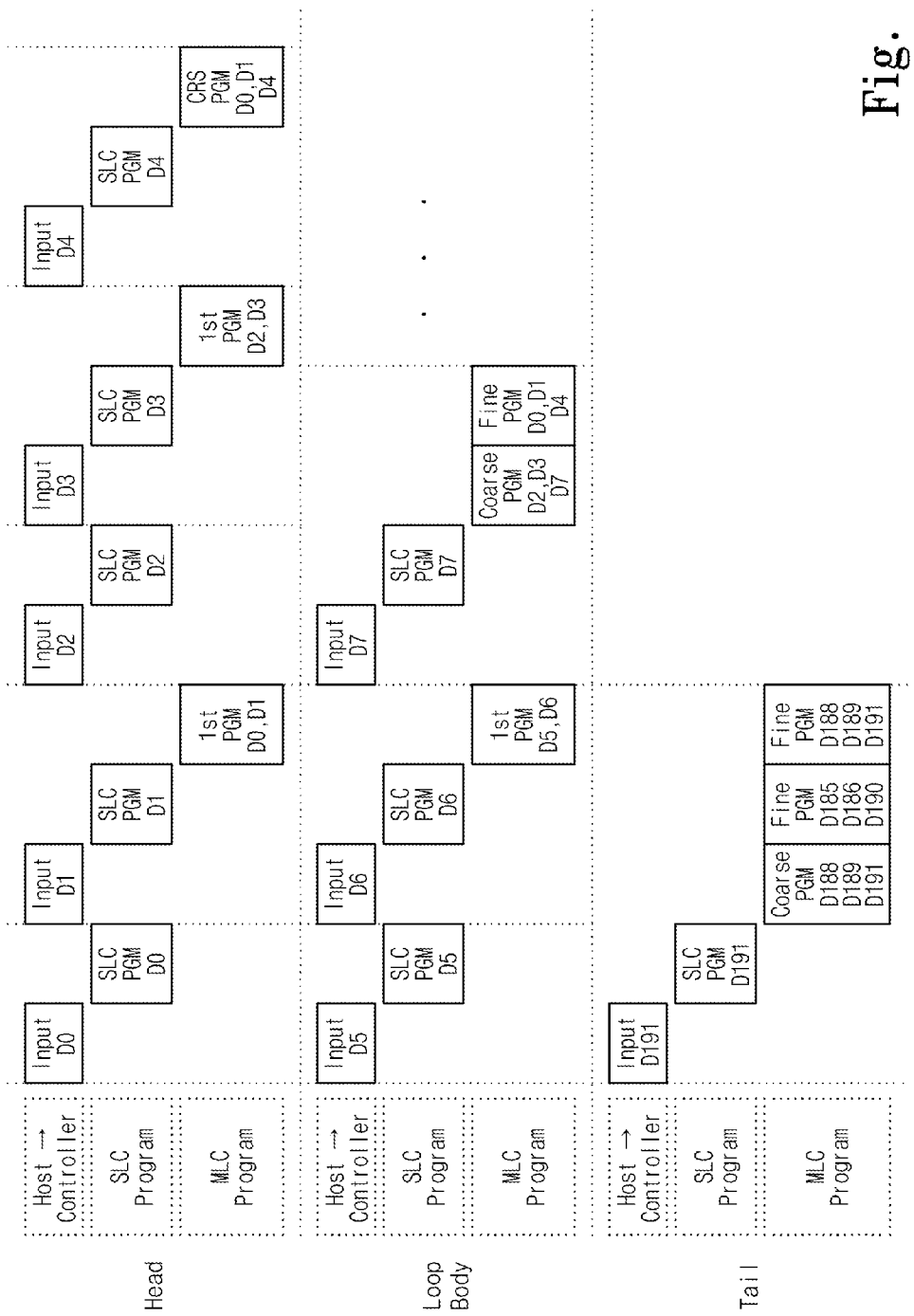
FIG. 10 is a diagram showing the flow of data during a program operation of a data storage system where an address scramble technique illustrated in FIG. 9 is applied.

FIG. 9 is a diagram showing an exemplary address scramble technique of a multi-bit memory device which stores 3-bit data per cell and to which a 3-step reprogram method is applied, and FIG. 10 is a diagram showing the flow of data during a program operation of a data storage system where an address scramble technique illustrated in FIG. 9 is applied. Below, a program operation of a data storage system according to another exemplary embodiment of the inventive concept will be more fully described with reference to the accompanying drawings.

For ease of description, as illustrated in FIG. 9, it is assumed that each memory block includes 64 word lines WL0 to WL63 and that each memory cell stores 3-bit data. With this assumption, 192 pages are stored in each memory block.

As described in FIGS. 3 and 4, directly after data Di (i being 0 to 191) of the minimum program unit for the first region 101 is stored in a buffer memory 201 of a memory controller 200, data Di stored in the buffer memory 201 is programmed in the first region 101 of a multi-bit memory device 100 through an SLC program operation. Further, the memory controller 200 judges whether data of the minimum program unit for the second region 102 is gathered at the first region 101. A 1-step program operation, a coarse program operation, or a fine program operation for the second region 102 is carried out according to the judgment result. A 1-step program operation, a coarse program operation, or a fine program operation for the second region 102 is determined according to an address scramble order illustrated in FIG. 9. For example, For example, in a case where D0 and D1 data is stored in the first region 101, the 1-step program operation for a word line WL0 is performed depending upon the D0 and D1 data stored in the first region 101. If D2 and D3 data is stored in the first region 101, the 1-step program operation for a word line WL1 is performed depending upon the D2 and D3 data stored in the first region 101.

Continuously, if data D4 is stored in the first region 101, the coarse program operation for the word line WL0 is executed depending upon the D0, D1, and D4 data stored in the first region 101. When D5 and D6 data is stored in the first region 101, the 1-step program operation for a word line WL2 is executed depending upon the D5 and D6 data stored in the first region 101. When data D7 is stored in the first region 101, the coarse program operation for the word line WL1 is carried out depending upon the D2, D3, and D7 data stored in the first region 101. After the coarse program operation for the word line WL1 is carried out depending upon the D2, D3, and D7 data stored in the first region 101, the fine program operation for the word line WL0 is carried out depending upon the D0, D1, and D4 data stored in the first region 101. Afterwards, until data D191 is stored in the first region 101, the remaining data D8 to D190 may be stored in the second region 102 in the same order as the 1-step program operation of D5 and D6 data, the coarse program operation of data D7, and the fine program operation of D0, D1, and D4 data.

In the event that data D191 is stored in the first region 101, the coarse program operation for a word line WL63 is executed depending upon D188, D189, and D191 data stored in the first region 101. After the coarse program operation for a word line WL63 is executed depending upon D188, D189, and D191 data stored in the first region 101, the fine program operation for a word line WL62 is executed depending upon D185, D186, and D190 data stored in the first region 101. Finally, the fine program operation for the word line WL63 is executed depending upon D188, D189, and D191 data stored in the first region 101.

Although 3-bit data is stored in each memory cell, a method of reading data from the multi-bit memory device 100 is made substantially identically to that described in FIG. 8, and a description thereof is thus omitted.

As described in FIG. 4, a program operation described in FIG. 10 may include program patterns. The program patterns may include an SLC program operation, a set of SLC and 1-step program operations, a set of SLC and coarse program operations, a set of SLC, coarse, and fine program operations, and a set of SLC, coarse, fine, and fine program operations. Each program operation is executed whenever a command is sent to a multi-bit memory device 100 from a memory controller 200, or a set of program operations in each program pattern is automatically performed by the multi-bit memory device 100.

Figure 11:
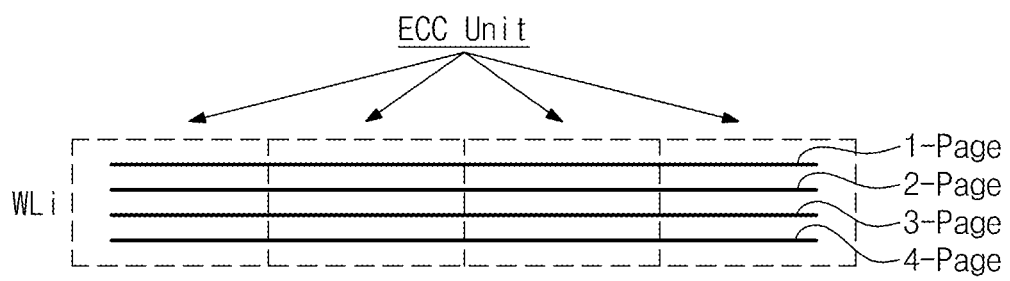
FIG. 11 is a diagram for describing a page interleave technique according to an exemplary embodiment of the inventive concept.

FIG. 11 is a diagram for describing a page interleave technique according to an exemplary embodiment of the inventive concept.

For ease of description, it is assumed that 4-page data is stored in memory cells in one word line. In general, generation of ECC data is made by a page unit. On the other hand, in the case of a page interleave technique for maintaining the error rate of each page constantly, pages to be stored in memory cells of each word line are divided into a plurality of ECC groups (for example, four ECC groups). ECC data is generated according to data in each ECC group. In the event that the page interleave technique is applied to a data storage system 1000, the minimum program unit for the first region 101 may be different from that described above. This will be more fully described with reference to FIG. 12.

Figure 12:
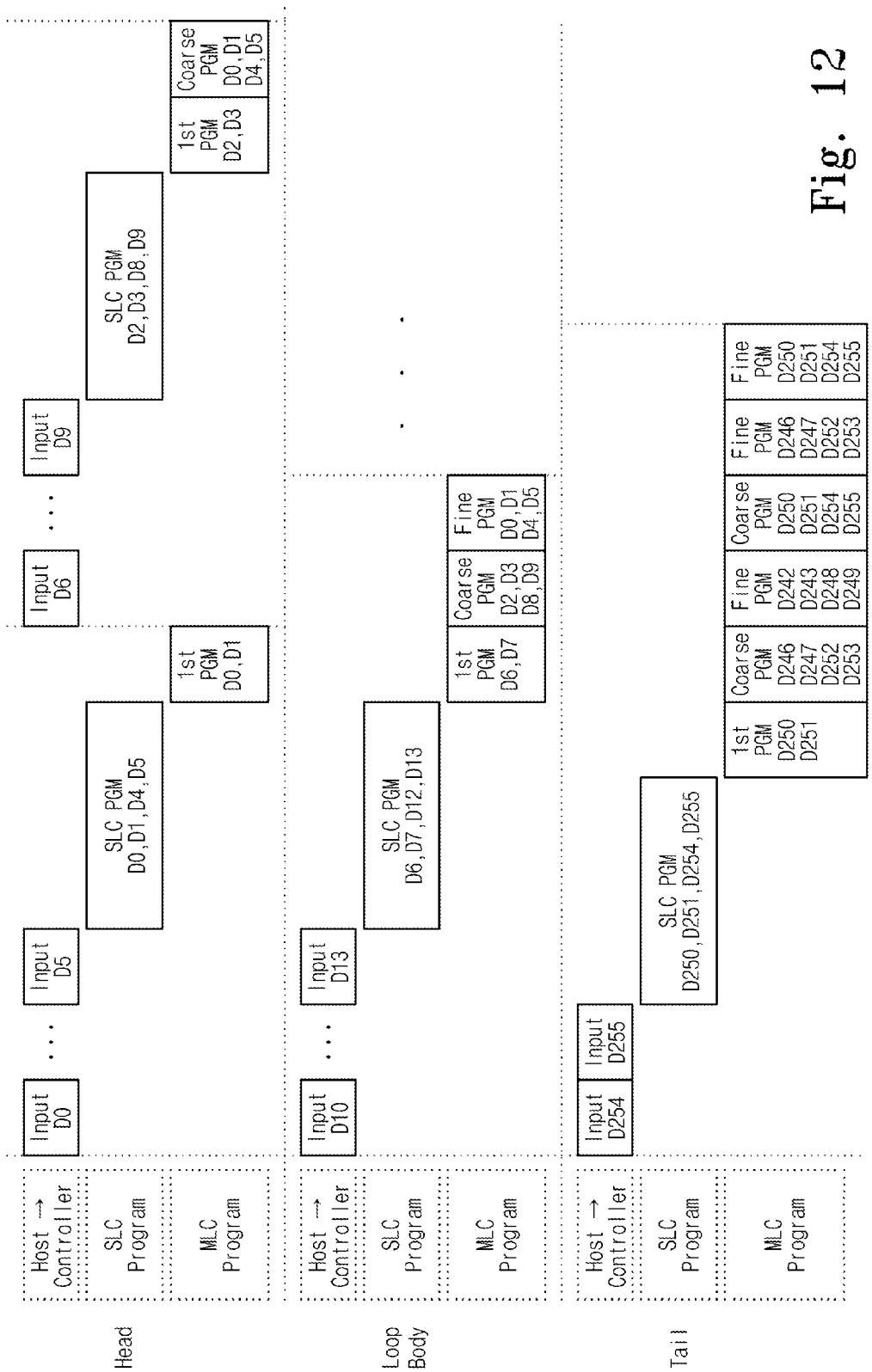
FIG. 12 is a diagram showing the flow of data during a program operation of data storage system to which a page interleave technique described in FIG. 11 is applied.

FIG. 12 is a diagram showing the flow of data during a program operation of data storage system to which a page interleave technique described in FIG. 11 is applied. Below, a program operation of a data storage system according to another exemplary embodiment of the inventive concept will be more fully described with reference to the accompanying drawings.

For ease of illustration, it is assumed that each memory block includes 64 word lines WL0 to WL63 and that each memory cell stores 4-bit data. With this assumption, 256 pages are stored in each memory block. A program operation of a data storage system with a page interleave technique will be described under the assumption that an address scramble technique described in FIG. 3 is used.

Referring to FIG. 12, data is transferred to a memory controller 200 from a host 300. Since a page interleave technique is used, the memory controller 200 waits until data to be stored in a word line WL0, that is, 4-page data D0, D1, D4, and D5 is stored. Once data to be stored in a word line WL0, that is, 4-page data D0, D1, D4, and D5 is stored in a buffer memory 201, data to be stored in a word line WL0, that is, 4-page data D0, D1, D4, and D5 is stored sequentially in the first region 101 of a multi-bit memory device 100 according to the control of the memory controller 200. As described above, the data is stored in the first region 101 through a single-bit/SLC program operation. And then, a 1-step program operation for a word line WL0 is carried out depending upon the D0 and D1 data stored in the first region 101. When page data D6 to D9 is received to the memory controller 200 from the host 300, data to be stored in a word line WL1, that is, 4-page data D2, D3, D8, and D9 is stored sequentially in the first region 101 of the multi-bit memory device 100 according to the control of the memory controller 200. A 1-step program operation for a word line WL1 and a coarse program operation for the word line WL0 are carried out sequentially depending upon the D2 and D3 data and the D4 and D5 data stored in the first region 101.

When page data D10 to D13 is received to the memory controller 200 from the host 300, data to be stored in the word line WL1, that is, 4-page data D6, D7, D12, and D13 is stored sequentially in the first region 101 of the multi-bit memory device 100 according to the control of the memory controller 200. A 1-step program operation for a word line WL3, a coarse program operation for the word line WL1, and a fine program operation for the word line WL0 are carried out sequentially depending upon data stored in the first region 101. An operating pattern carried out when data D10 to D14 is received is repeated until data D254 is stored in the buffer memory 201.

If data D254 and D255 is stored in the buffer memory 201 of the memory controller 200, data to be stored at a word line WL63, that is, 4-page data D250, D251, D254, and D255 is stored sequentially in the first region 101 of the multi-bit memory device 100 according to the control of the memory controller 200. And then, the 1-step program operation for the word line WL63, the coarse program operation for the word line WL62, the fine program operation for the word line WL61, the coarse program operation for the word line WL63, the fine program operation for the word line WL62, and the fine program operation for the word line WL63 may be sequentially performed according to data stored in the first region 101.

In an exemplary embodiment, a size of the first region 101 of the multi-bit memory device 100 is determined depending upon the number of open blocks and the minimum page number to be retained by the first region 101. Before a first memory block is filled by data, a random write operation can be requested with respect to a second memory block which is different from the first memory block. In this case, the first memory block is called an open block. The number of open blocks is capable of being determined differently according to the policy of managing the multi-bit memory device 100. The minimum page number to be retained by the first region 101 may correspond to the amount of data (for example, D0 to D9) stored in the second region 102 before a fine program operation for a word line (for example, WL0) is completed. The minimum page number to be retained by the first region 101, for example, may be about 10-pages in a case where an address scramble technique in FIG. 3 is applied to a data storage system.

Figure 14:
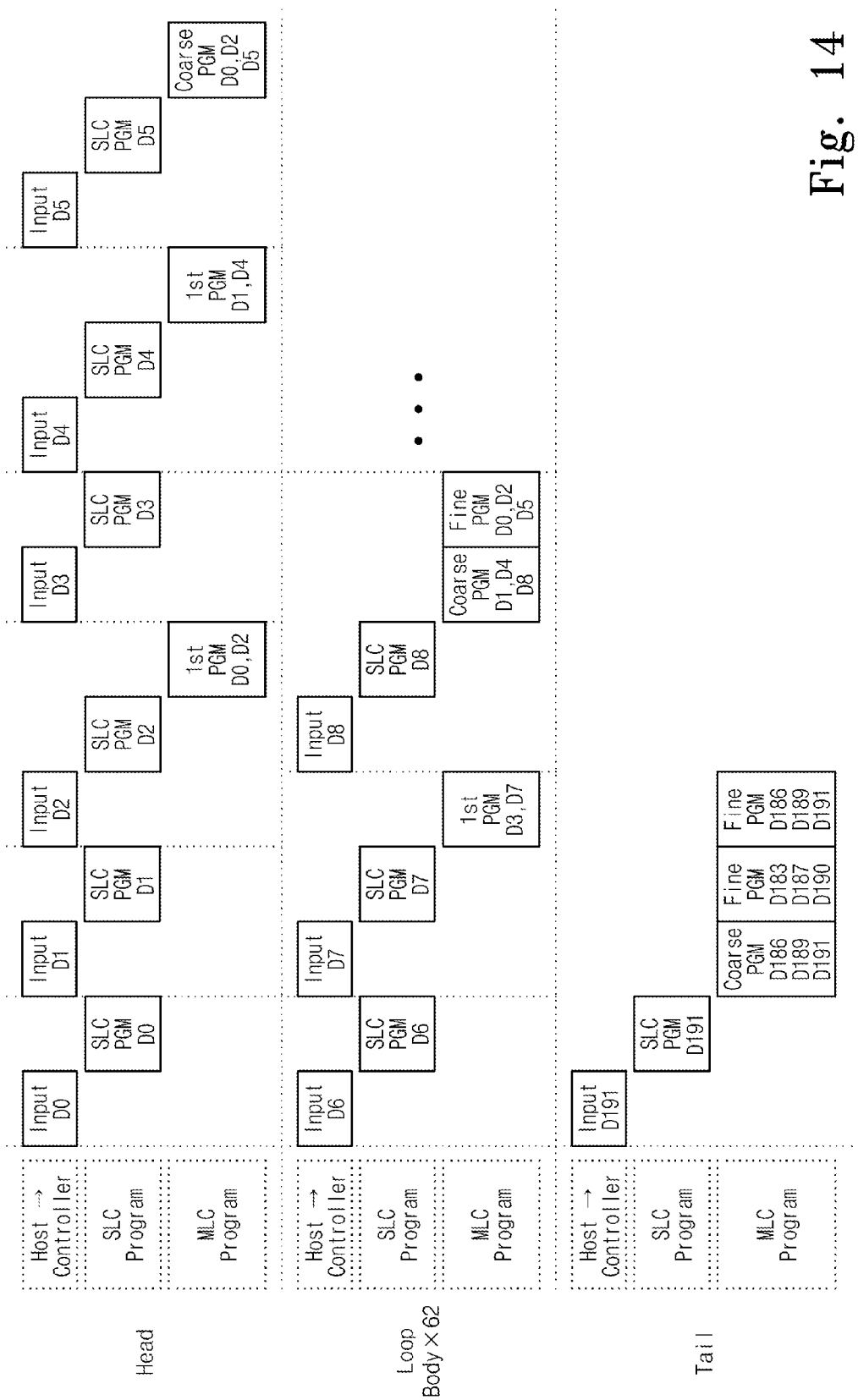
FIG. 14 is a diagram showing the flow of data during a program operation executed according to an address scramble technique illustrated in FIG. 13.

FIG. 13 is a diagram showing an exemplary address scramble technique of a multi-bit memory device which stores 3-bit data per cell and to which a 3-step reprogram method is applied, and FIG. 14 is a diagram showing the flow of data during a program operation of a data storage system illustrated in FIG. 12. Below, an operation of a data storage system according to an exemplary embodiment of the inventive concept will be more fully described with reference to the accompanying drawings.

In order to simplify the description, as illustrated in FIG. 13, it is assumed that each memory block includes 64 word lines WL0 to WL63 and that each memory cell stores 3-bit data. With this assumption, 192 pages are stored in each memory block.

First of all, if data D0 of the minimum program unit for the first region 101 is transferred to a buffer memory 201 of a memory controller 200 from a host 300, the data D0 stored in the buffer memory 201 is programmed in the first region 101 of the multi-bit memory device 100 according to the control of the memory controller 200. As described above, the data D0 is programmed in the first region 101 through an SLC program operation. The memory controller 200 judges whether data of the minimum program unit for the second region 102 is gathered at the first region 101, and controls a main program operation according to the judgment result. Whether data of the minimum program unit for the second region 102 is gathered at the first region 101 may be judged according to a page address. Since only one page D0 is stored in the first region 101, the main program operation is not carried out. If data D1 of the minimum program unit for the first region 101 is transferred to the buffer memory 201 of the memory controller 200 from the host 300, the data D1 stored in the buffer memory 201 is programmed in the first region 101 of the multi-bit memory device 100 according to the control of the memory controller 200.

If data D2 of the minimum program unit for the first region 101 is transferred to the buffer memory 201 of the memory controller 200 from the host 300, the data D2 stored in the buffer memory 201 is programmed in the first region 101 of the multi-bit memory device 100 according to the control of the memory controller 200. Since data of the minimum program unit for the second region 102 (for example, 2-page necessary for a 1-step program operation) is gathered at the first region 101, the memory controller 200 controls the multi-bit memory device 100 such that data D0 and D2 stored in the first region 101 is stored in the second region 102. That is, the 1-step program operation for a word line WL0 is executed based on the data D0 and D2 stored in the first region 101.

If data D3 of the minimum program unit for the first region 101 is transferred to the buffer memory 201 of the memory controller 200 from the host 300, the data D3 stored in the buffer memory 201 is programmed in the first region 101 of the multi-bit memory device 100 according to the control of the memory controller 200. If data D4 of the minimum program unit for the first region 101 is transferred to the buffer memory 201 of the memory controller 200 from the host 300, the data D4 stored in the buffer memory 201 is programmed in the first region 101 of the multi-bit memory device 100 according to the control of the memory controller 200. Since data of the minimum program unit for the second region 102 (for example, 2-page necessary for a 1-step program operation) is gathered at the first region 101, the memory controller 200 controls the multi-bit memory device 100 such that data D1 and D4 stored in the first region 101 is stored in the second region 102. That is, the 1-step program operation for a word line WL1 is executed based on the data D1 and D4 stored in the first region 101.

As described above, if data of the minimum program unit for the first region 101 is stored in the buffer memory 201, data stored in the buffer memory 201 is programmed in the first region 101 of the multi-bit memory device 100 under the control of the memory controller 200. Data is stored in the first region 101 through the SLC program operation. If data Di (i being 0 to 191) of the minimum program unit for the first region 101 is stored in the buffer memory 201, as described in FIG. 14, data stored in the buffer memory 201 is programmed in the first region 101 of the multi-bit memory device 100 through the SLC program operation under the control of the memory controller 200. Together with the judgment of whether data of the minimum program unit for the first region 101 is stored in the buffer memory 201, the memory controller 200 judges whether data of the minimum program unit for the second region 102 is gathered at the first region 101. The memory controller 200 may control the 1-step program operation, the coarse program operation, or the fine program operation for the second region 102, depending upon the judgment result, which will be more fully described below.

The 1-step program operation, the coarse program operation, or the fine program operation for the second region 102 may be determined in an address scramble technique illustrated in FIG. 13. For example, in the event that D0 and D2 data is stored in the first region 101, the 1-step program operation for a word line WL0 is carried out depending upon the D0 and D2 data stored in the first region 101. If D1 and D4 data is stored in the first region 101, the 1-step program operation for a word line WL1 is carried out. That is, the 1-step program operation for the word line WL1 is carried out depending upon the D1 and D4 data stored in the first region 101.

Continuously, if D5 data is stored in the first region 101, the coarse program operation for the word line WL0 is carried out depending upon the D0, D2, and D5 data stored in the first region 101. When D3 and D7 data is stored in the first region 101, the 1-step program operation for the word line WL2 is carried out depending upon the D3 and D7 data stored in the first region 101. In the event that D8 data is stored in the first region 101, the coarse program operation for the word line WL1 is carried out depending upon the D1, D4, and D8 data stored in the first region 101. After the coarse program operation for the word line WL1 is carried out depending upon the D1, D4, and D8 data stored in the first region 101, the fine program operation for the word line WL0 is executed depending on D0, D2, and D5 data stored in the first region 101. Afterwards, until D191 data is stored in the first region 101, the remaining data D10 to D190 may be stored in the second region 102 in the same order as the 1-step program operation of D3 and D7 data, the coarse program operation of D1, D4 and D8 data, and the fine program operation of D0, D2, and D5 data.

In the case that D191 data is stored in the first region 101, the coarse program operation for the word line WL63 is carried out depending upon D186, D189, and D191 data stored in the first region 101. After the coarse program operation for the word line WL63 is carried out depending upon D186, D189, and D191 data stored in the first region 101, the fine program operation for the word line WL62 is executed depending upon D183, D187, and D190 data stored in the first region 101. Finally, the fine program operation for the word line WL63 is executed depending upon D186, D189, and D191 data stored in the first region 101.

As understood from FIG. 14, it is possible to judge an SLC program operation (for example, the first program pattern), a set of SLC and 1-step program operations (for example, the second program pattern), a set of SLC and coarse program operations (for example, the third program pattern), a set of SLC, coarse, and fine program operations (for example, the fourth program pattern), and a set of SLC, coarse, fine, and fine program operations (for example, the fifth program pattern), depending upon data to be stored in the first region 101, that is, a page address of data to be stored in the first region 101. As described with reference to the table 1, the SLC program operation, the 1-step program operation, the coarse program operation, or the fine program operation, for example, may be carried out when corresponding commands are provided to the multi-bit memory device 100 from the memory controller 200. Alternatively, a command set indicating a program pattern may be provided to the multi-bit memory device 100, and the multi-bit memory device 100 performs a set of operations automatically according to the command set. The program pattern is formed of an SLC program operation, a set of SLC and 1-step program operations, a set of SLC and coarse program operations, a set of SLC, coarse, and fine program operations, or a set of SLC, coarse, fine, and fine program operations. A set of program operations in a program pattern may be changed according to an address scramble technique, a cell-per-bit number, and the like.

Figure 15:
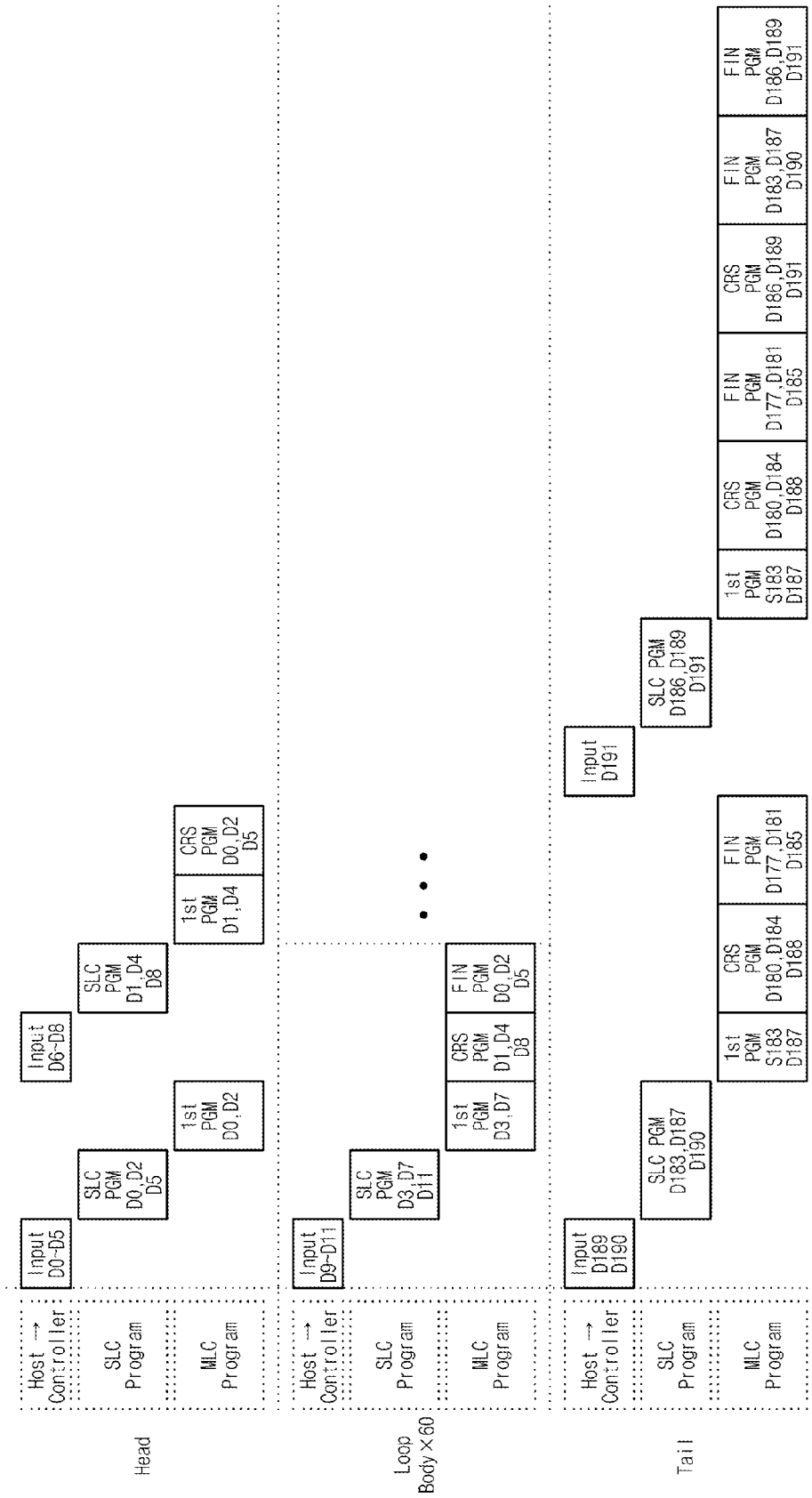
FIG. 15 is a diagram showing a data flow at a program operation of a data storage system to which a page interleave technique described in FIG. 11 and an address scramble technique described in FIG. 13 are applied.

FIG. 15 is a diagram showing a data flow at a program operation of a data storage system to which a page interleave technique described in FIG. 11 and an address scramble technique described in FIG. 13 are applied. Below, a program operation of a data storage system according to another embodiment of the inventive concept will be more fully described with reference to the accompanying drawings.

In order to simplify the description, it is assumed that each memory block includes 64 word lines WL0 to WL63 and that each memory cell stores 3-bit data. With this assumption, 192 pages are stored in each memory block. There is described a program operation of a data storage system to which a page interleave technique described in FIG. 11 is applied, under the assumption that an address scramble technique described in FIG. 13 is applied.

Referring to FIG. 15, data is transferred to a memory controller 200 from a host 300. Since a page interleave technique is used, the memory controller 200 waits until data to be stored in a word line WL0, that is, 3-page data D0, D2, and D5 is stored. Once data to be stored in a word line WL0, that is, 4-page data D0, D2, and D5 is stored in a buffer memory 201, data to be stored in a word line WL0, that is, 3-page data D0, D2, and D5 is stored sequentially in the first region 101 of a multi-bit memory device 100 according to the control of the memory controller 200. As described above, the data is stored in the first region 101 through a single-bit/SLC program operation. And then, a 1-step program operation for a word line WL0 is carried out depending upon the D0 and D2 data stored in the first region 101. When page data D6 to D8 is received to the memory controller 200 from the host 300, data to be stored in a word line WL1, that is, 3-page data D1, D4, and D8 is stored sequentially in the first region 101 of the multi-bit memory device 100 according to the control of the memory controller 200. A 1-step program operation for a word line WL1 and a coarse program operation for the word line WL0 are carried out sequentially depending upon the D1 and D4 data and the D0, D2, and D5 data stored in the first region 101.

When page data D9 to D11 is received to the memory controller 200 from the host 300, data to be stored in the word line WL2, that is, 3-page data D3, D7, and D11 is stored sequentially in the first region 101 of the multi-bit memory device 100 according to the control of the memory controller 200. A 1-step program operation for a word line WL2, a coarse program operation for the word line WL1, and a fine program operation for the word line WL0 are carried out sequentially depending upon data stored in the first region 101. An operating pattern carried out when data D9 to D11 is received is repeated until data D189 is stored in the buffer memory 201.

When page data D189 and D190 is stored in the buffer memory 201 of the memory controller 200, data to be stored in the word line WL62, that is, 3-page data D183, D187, and D190 is stored sequentially in the first region 101 of the multi-bit memory device 100 according to the control of the memory controller 200. And then, a 1-step program operation for a word line WL62, a coarse program operation for the word line WL61, and a fine program operation for the word line WL60 are carried out sequentially depending upon data stored in the first region 101.

If data D191 is stored in the buffer memory 201 of the memory controller 200, data to be stored at a word line WL62, that is, 3-page data D186, D189, and D191 is stored sequentially in the first region 101 of the multi-bit memory device 100 according to the control of the memory controller 200. And then, the 1-step program operation for the word line WL63, the coarse program operation for the word line WL62, the fine program operation for the word line WL61, the fine program operation for the word line WL62, and the fine program operation for the word line WL63 may be sequentially performed according to data stored in the first region 101.

FIG. 16 is a diagram showing another address scramble technique of a multi-bit memory device in which 4-bit data is stored in a memory cell and a reprogram method is used.

An address scramble technique illustrated in FIG. 16 may be applied to a multi-bit memory device storing 4-bit data per cell. A data storage system using the address scramble technique illustrated in FIG. 16 may operate identically to that described above. For example, when data of a minimum program unit on the first region 101 is stored in a buffer memory 201, a memory controller 200 may control a multi-bit memory device 100 such that data stored in the buffer memory 201 is programmed in the first region 101. Likewise, the memory controller 200 may judge whether data of a minimum program unit on the second region 102 is prepared in the first region 101 and control the multi-bit memory device 100 such that a 1-step program operation, a coarse program operation, and a fine program operation are executed according to the judgment. Such operations may be executed according to patterns in FIG. 1 based on page address information.

FIGS. 17A to 17D are diagrams for describing various combinations on the first and second regions of a multi-bit memory device according to an exemplary embodiment of the inventive concept. In figures, "BP" indicates buffer programming on the first region 101, and "MP" indicates main programming on the second region 102.

As described above, a multi-bit memory device 100 may include the first region 101 and the second region 102. Herein, the first and second regions 101 and 102 may constitute a memory cell array of the multi-bit memory device 100. Although not illustrated in figures, the memory cell array may include further regions such as a meta region, a reserved region, and the like. It is well understood that regions of the memory cell array may be divided logically, rather than physically. This means that such regions of the memory cell array may be defined according to address mapping of a memory controller 200.

Figure 17A:
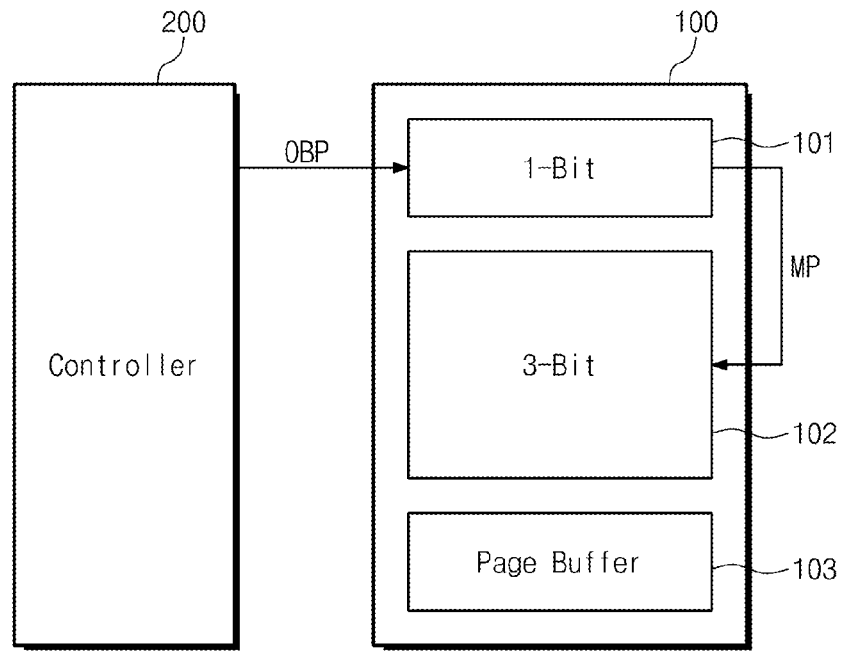
FIGS. 17A to 17D are diagrams for describing various combinations of first and second regions of a multi-bit memory device according to an exemplary embodiment of the inventive concept.

Referring to the example of FIG. 17A, in the case of a multi-bit memory device which stores 3-bit data per cell, the first region 101 is formed of memory cells each storing 1-bit data, and the second region 102 is formed of memory cells each storing 3-bit data. In this case, buffer programming may be executed according to an SLC program operation, and main programming may be executed according to the above-described MLC program operation.

Figure 17B:
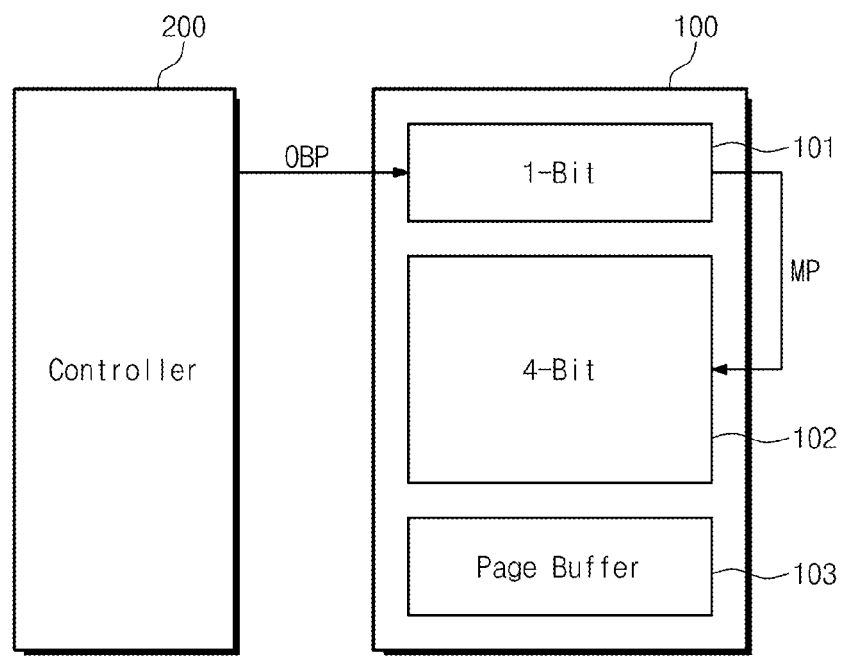

Referring to the example of FIG. 17B, in the case of a multi-bit memory device which stores 4-bit data per cell, the first region 101 is formed of memory cells each storing 1-bit data, and the second region 102 is formed of memory cells each storing 4-bit data. In this case, buffer programming may be executed according to an SLC program operation, and main programming may be executed according to the above-described MLC program operation.

Figure 17C:
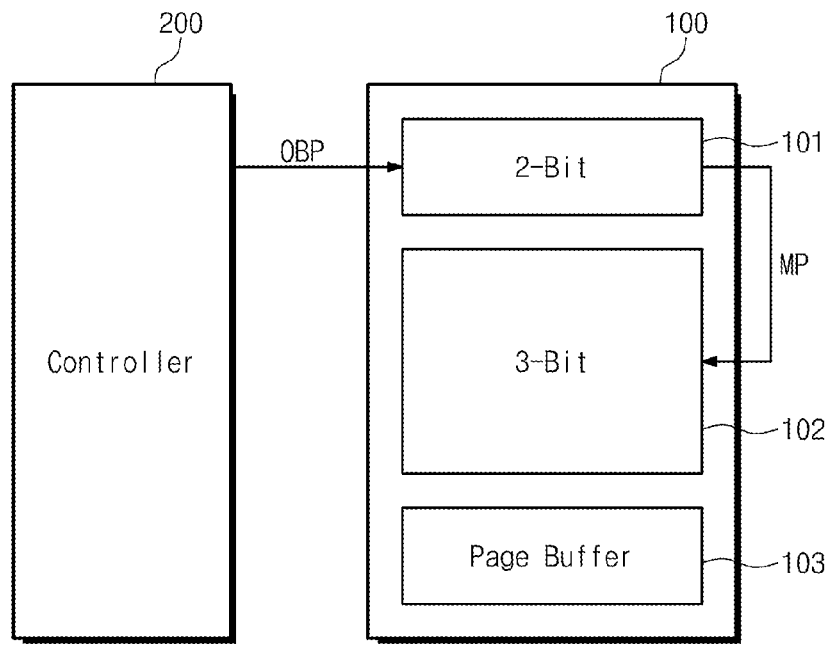

Referring to the example of FIG. 17C, in the case of a multi-bit memory device which stores 3-bit data per cell, the first region 101 is formed of memory cells each storing 2-bit data, and the second region 102 is formed of memory cells each storing 3-bit data. In this case, buffer programming may be executed according to the above-described or conventional MLC program operation, and main programming may be executed according to the above-described MLC program operation (for example, a reprogram operation).

Figure 17D:
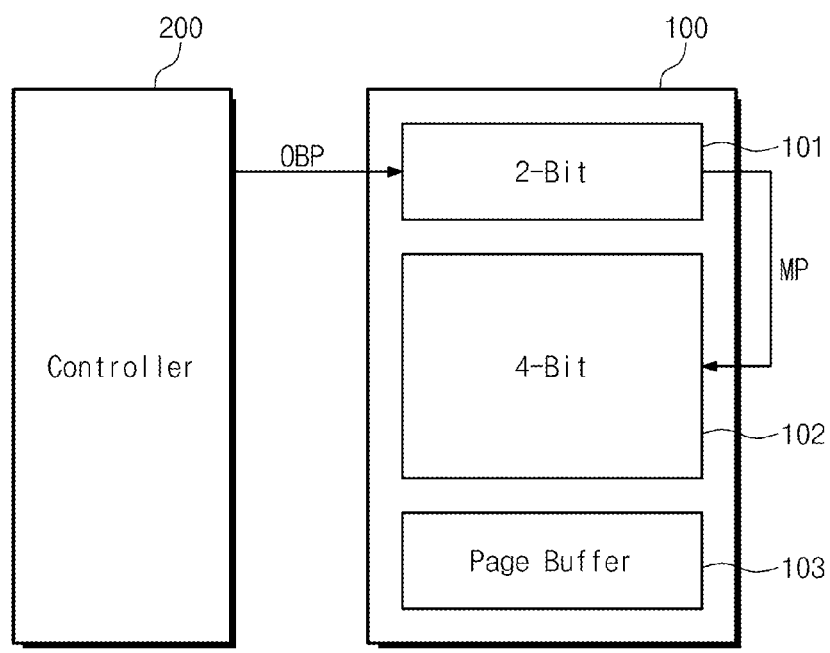

Referring to the example of FIG. 17D, in the case of a multi-bit memory device which stores 4-bit data per cell, the first region 101 is formed of memory cells each storing 2-bit data, and the second region 102 is formed of memory cells each storing 4-bit data. In this case, buffer programming may be executed according to the above-described or conventional MLC program operation, and main programming may be executed according to the above-described MLC program operation (for example, a reprogram operation).

The defining of the first and second regions 101 and 102 illustrated in FIGS. 17A to 17D is not limited to this disclosure. For example, if a storage media included in a data storage device is formed of a plurality of multi-bit memory devices (or chips), the first and second regions 101 and 102 can be defined with respect to the respective multi-bit memory devices. Alternatively, the first region 101 can be defined with respect to any one of the multi-bit memory devices. Alternatively, any one multi-bit memory device can be defined as the first region 101.

Figure 18:
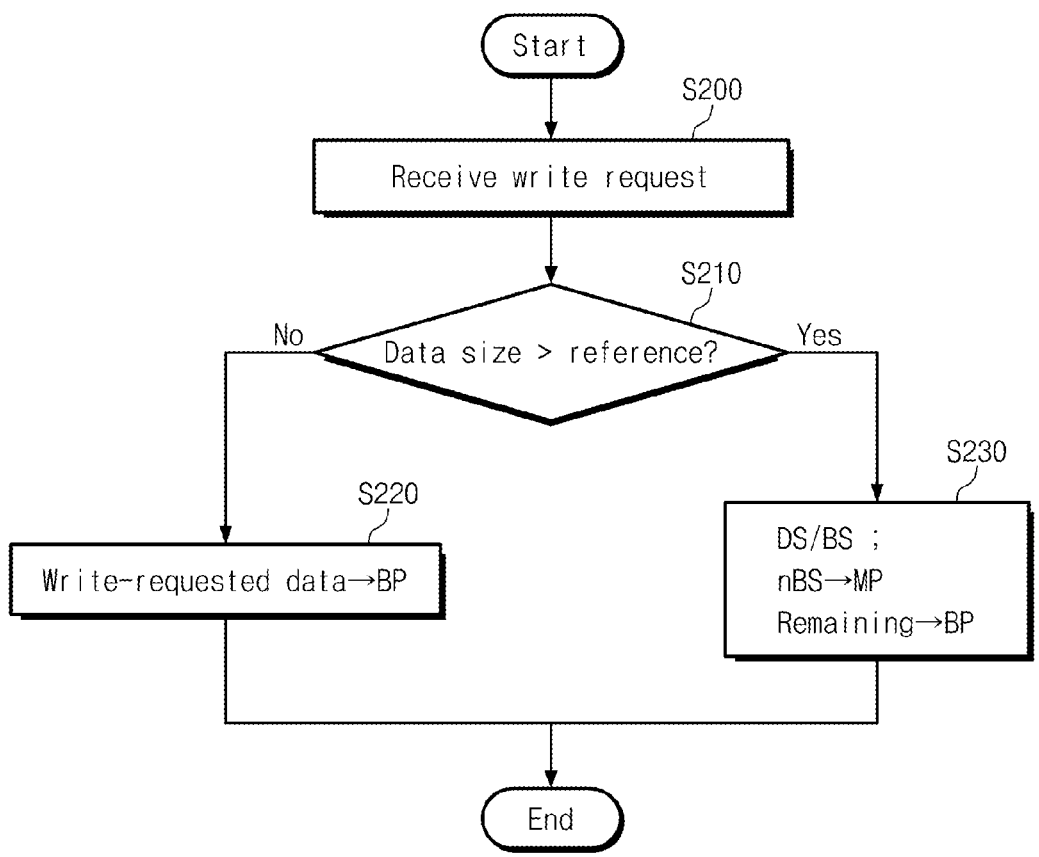
FIG. 18 is a flowchart for describing an operation of a data storage system according to still another exemplary embodiment of the inventive concept.
Figure 19:
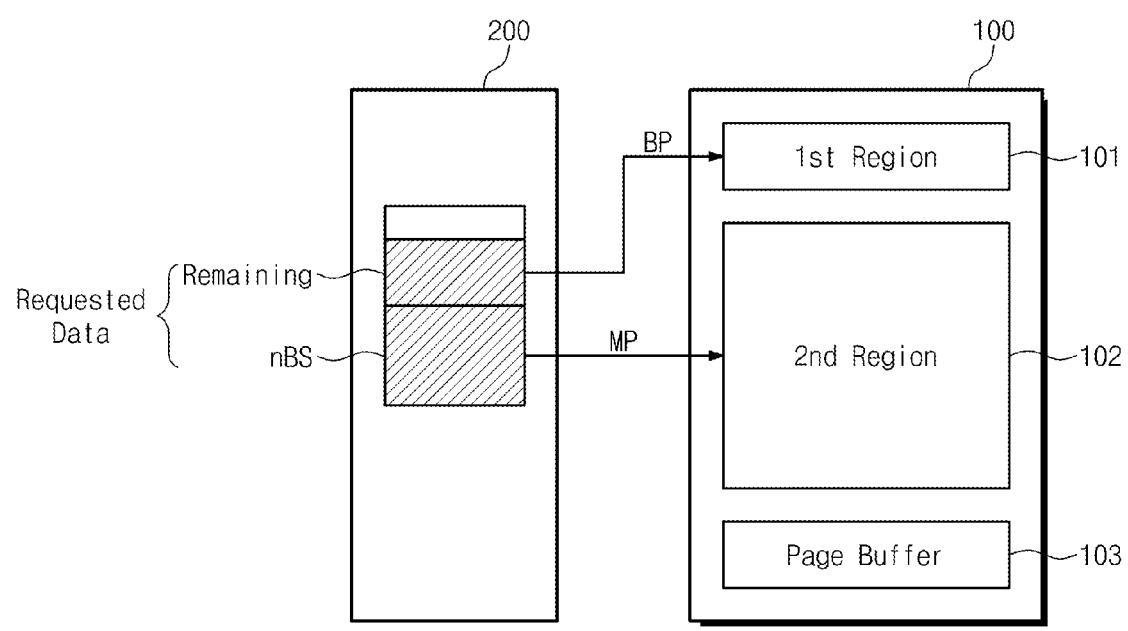
FIG. 19 is a diagram showing a manner of programming a data storage system described in FIG. 18.

FIG. 18 is a flowchart for describing an operation of a data storage system according to still another exemplary embodiment of the inventive concept, FIG. 19 is a diagram showing a program operation of a data storage system described in FIG. 18. Below, an operation of a data storage system according to still another exemplary embodiment of the inventive concept will be more fully described with reference to the accompanying drawings.

In step S200, a memory controller 200 receives a write request from an external device (for example, a host 300). An interface configuration between the memory controller 200 and the host 300 may be variously determined. For example, the memory controller 200 may be configured to communicate with the host 300 via at least one of various interface protocols such as USB (Universal Serial Bus) protocol, MMC (multimedia card) protocol, PCI (peripheral component interconnection) protocol, PCI-E (PCI-express) protocol, ATA (Advanced Technology Attachment) protocol, Serial-ATA protocol, Parallel-ATA protocol, SCSI (small computer small interface) protocol, ESDI (enhanced small disk interface) protocol, IDE (Integrated Drive Electronics) protocol, and the like.

In an exemplary embodiment, the write request provided from the host 300 may include write information and write data. The write information includes a command, a size of data to be transferred, and the like, and the write data is data to be stored in a multi-bit memory device 100. In other words, size information of data to be sent may be transferred to the memory controller 200 from the host 300 according to one write request regardless of an interface configuration between the memory controller 200 and the host 300. Herein, it is noted that a size of data to be transferred at one write request is not a transfer unit (for example, referred to as a data packet) between the memory controller 200 and the host 300. But, it is well understood that the inventive concept is not limited to this disclosure.

In step S210, the memory controller 200 may judge whether a size of write-requested data exceeds a reference size. The reference size, for example, may correspond to a size of one memory block of the multi-bit memory device 100. But, the reference size may be determined to correspond to a plurality of memory blocks. Alternatively, where the multi-bit memory device 100 has the N-mat architecture (for example, N=2), the reference size may correspond to a size of N memory blocks (for example, two memory blocks) of the multi-bit memory device 100 which are programmed at the same time. It is well understood that the reference size is not limited to this disclosure.

If the size of write-requested data does not exceed the reference size, the method proceeds to step S220. In step S220, the write-requested data may be programmed in the first region 101 of the multi-bit memory device 100 via a buffer program operation. The buffer program operation is substantially identical to that described in FIGS. 3 to 16, and a description thereof is thus omitted. Afterwards, the method ends.

If the size of write-requested data exceeds the reference size, the method proceeds to step S230. In step S230, a size DS of the write-requested data may be divided by a reference size BS (for example, a size of a memory block (in the case of the N-mat architecture, a size of N memory blocks). In step S230, write-requested data corresponding to the quotient nBS (n being 1 or more integer, BS indicating a memory block size) may be programmed directly in the second region 102 of the multi-bit memory device 100 via a main program operation MP as illustrated in FIG. 19. Write-requested data corresponding to the remaining may be programmed in the first region 101 of the multi-bit memory device 100 via the buffer program operation BP as illustrated in FIG. 19. Afterwards, the method ends.

The main program operation used in step S230 may be executed to be substantially identical to that described in FIG. 1A. For example, a 1-step program operation, a coarse program operation, and a fine program operation on the second region 102 may be executed according to an address scramble technique illustrated in FIG. 1A, based on data stored in a buffer memory 201. Where write-requested data is programmed directly in the second region 102 without the buffer program operation, the amount of data to be maintained by the buffer memory 201 of the memory controller 200 may correspond to 10 pages in the case of 4-bit data and 8 pages in the case of 3-bit data.

In an exemplary embodiment, next write-requested data may be stored in an unused region of a memory block in the second region 102 in which the remaining of write-requested data is stored using the buffer program operation.

With the above-described program operation, it is possible to reduce a size of a buffer memory 201 via a buffer program operation and to improve the operating performance via direct writing of data to the second region 102 from the buffer memory 201.

Figure 20:
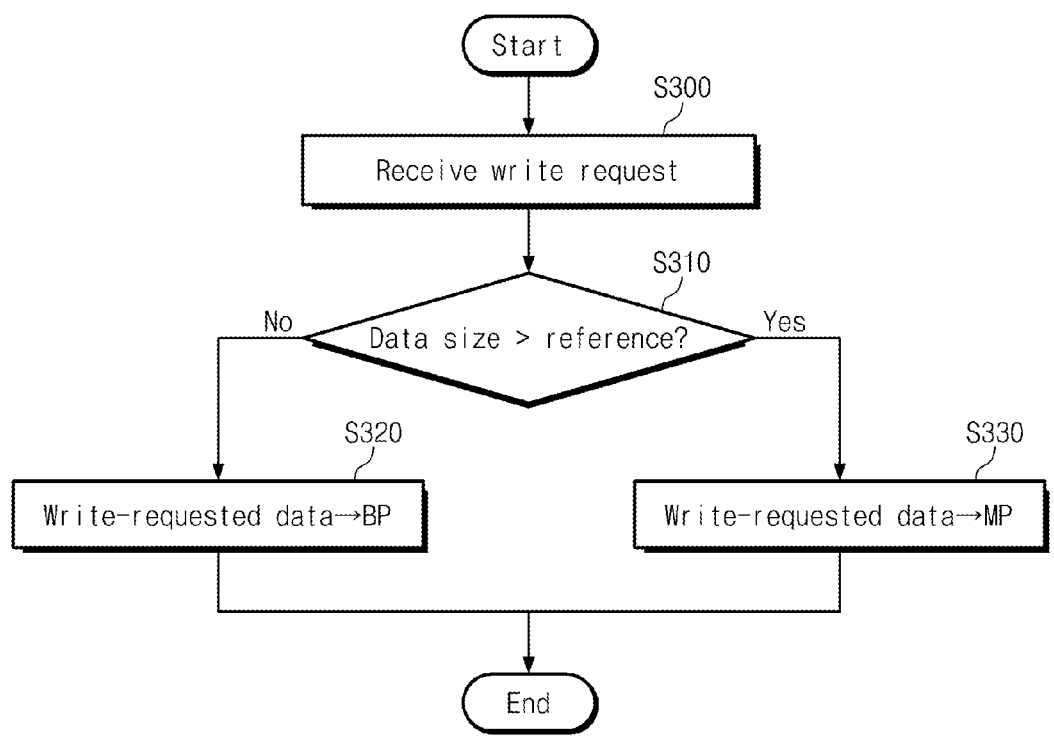
FIG. 20 is a flowchart for describing an operation of a data storage system according to yet another exemplary embodiment of the inventive concept.
Figure 21:
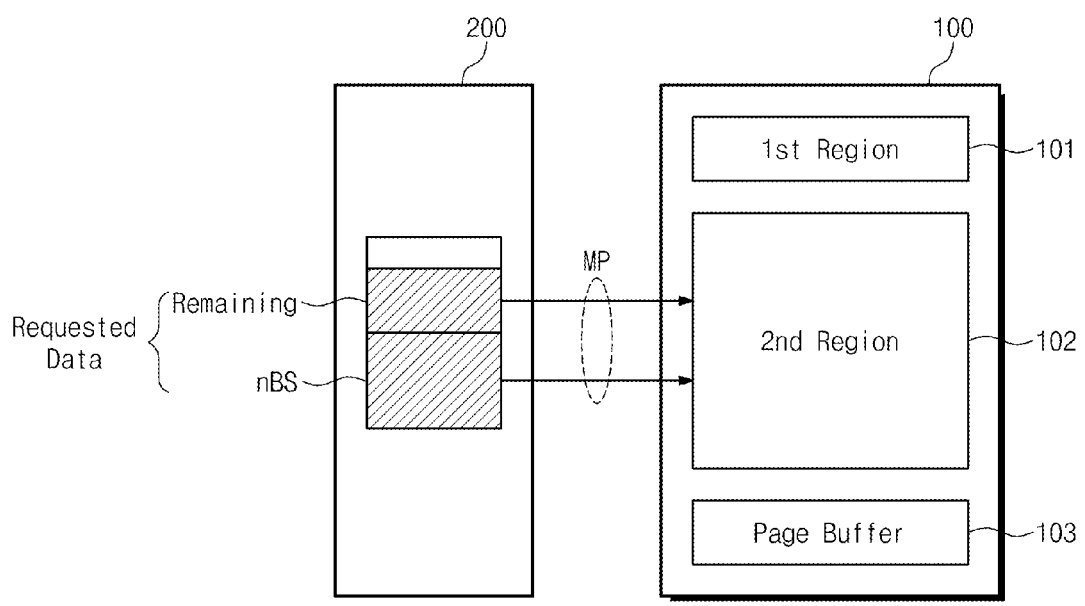
FIG. 21 is a diagram showing a manner of programming a data storage system described in FIG. 20.

FIG. 20 is a flowchart for describing an operation of a data storage system according to yet another exemplary embodiment of the inventive concept, and FIG. 21 is a diagram showing a program operation of a data storage system described in FIG. 20. Below, an operation of a data storage system according to yet another exemplary embodiment of the inventive concept will be more fully described with reference to the accompanying drawings.

In step S300, a memory controller 200 receives a write request from an external device (for example, a host 300). In step S310, the memory controller 200 may judge whether a size of write-requested data exceeds a reference size. The reference size, for example, may correspond to a size of one memory block of the multi-bit memory device 100. But, the reference size may be determined to correspond to a plurality of memory blocks. Alternatively, where the multi-bit memory device 100 has the N-mat architecture (for example, N=2), the reference size may correspond to a size of N memory blocks (for example, two memory blocks) of the multi-bit memory device 100 which are programmed at the same time. It is well understood that the reference size is not limited to this disclosure.

If the size of write-requested data does not exceed the reference size, the method proceeds to step S320. In step S320, the write-requested data may be programmed in the first region 101 of the multi-bit memory device 100 via a buffer program operation. The buffer program operation is substantially identical to that described in FIGS. 3 to 16, and a description thereof is thus omitted. Afterwards, the method ends.

If the size of write-requested data exceeds the reference size, the method proceeds to step S330. In step S330, the write-requested data may be programmed directly in the second region 102 of the multi-bit memory device 100 via a main program operation MP as illustrated in FIG. 21. Where the last memory block of memory blocks used to store the write-requested data is not filled, an unused region of the last memory block is not filled by next write-requested data. The unused region may be recovered via a well-known merge operation (or, garbage collection). The main program operation used in step S330 may be executed to be substantially identical to that described in FIG. 1A. Where write-requested data is programmed directly in the second region 102 without the buffer program operation, the amount of data to be maintained by the buffer memory 201 of the memory controller 200 may correspond to 10 pages in the case of 4-bit data and 8 pages in the case of 3-bit data.

With the above-described program operation, it is possible to reduce a size of a buffer memory 201 via a buffer program operation and to improve the operating performance via direct writing of data to the second region 102 from the buffer memory 201.

Figure 22:
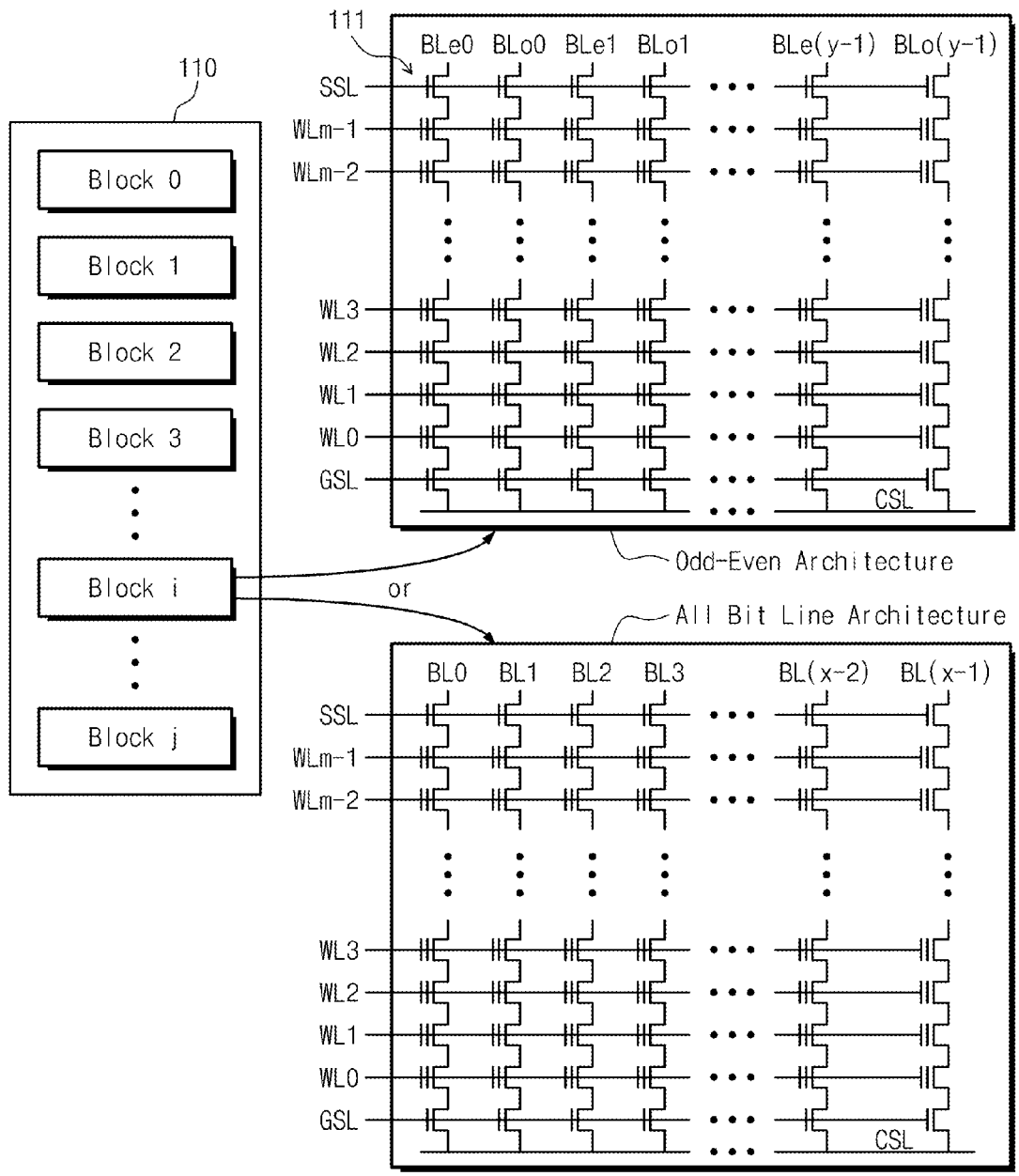
FIG. 22 illustrates a diagram showing a memory cell array having an all bit line memory architecture or the odd-even memory architecture.

FIG. 22 illustrates a diagram showing a memory cell array having the all bit line memory architecture or the odd-even memory architecture. Exemplary structures of a memory array 110 included in a multi-bit memory device 100 illustrated in FIG. 2 will be described. As one example, a NAND flash memory device including a memory cell array 110 partitioned into 1,024 blocks will now be described. The data stored in each block may be simultaneously erased. In one embodiment, the memory block is the minimum unit of storage elements that are simultaneously erased. Each memory block, for example, has columns each corresponding to bit lines (e.g., bit lines of 1 KB). In one embodiment referred to as the all bit line (ABL) architecture, all the bit lines of a memory block are capable of being simultaneously selected during read and program operations. Storage elements in a common word line and connected to all bit lines are capable of being programmed at the same time.

In an exemplary embodiment, a plurality of storage elements in the same column is connected in series to form a NAND string 111. One end of the NAND string 111 is connected to a corresponding to a bit line via a select transistor which is controlled by a string select line SSL, the other end is connected to a common source line CSL via a select transistor which is controlled by a ground select line GSL.

In another embodiment referred to as the odd-even architecture, bit lines are divided into even bit lines (BLe) and odd bit lines (BLo). In the odd/even bit line architecture, storage elements in a common word line and connected to the odd bit lines are programmed at the first time, while storage elements in the common word line and connected to even bit lines are programmed at the second time. Data is capable of being programmed and read into and from different blocks. Such operations are capable of being performed at the same time.

A flash memory device forming a multi-bit memory device according to an exemplary embodiment of the inventive concept is a non-volatile memory device which retains data even at power-off. With the increase in mobile-capable devices such as cellular phones, PDA's, digital cameras, portable game consoles, and MP3 players, a flash memory device is widely used as not only data storage but also code storage. The flash memory device, further, is capable of being used in non-mobile applications such as HDTV's, DVD players, routers, and GSP devices.

Figure 23:
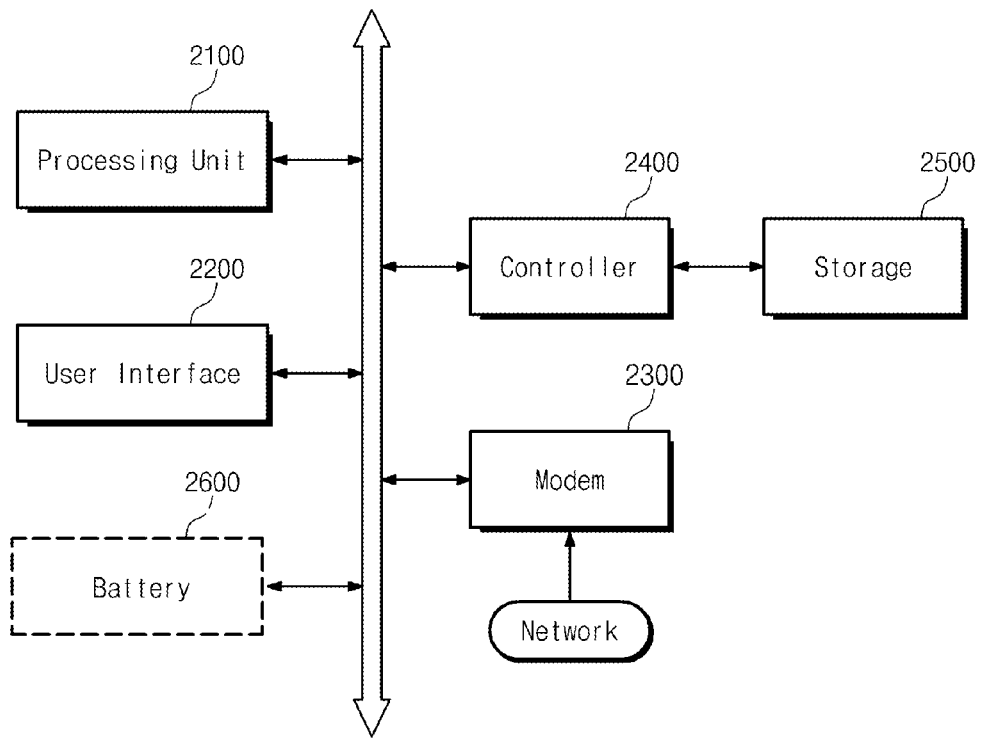
FIG. 23 is a block diagram showing a computing system according to an exemplary embodiment of the inventive concept.

FIG. 23 is a block diagram showing a computing system according to an exemplary embodiment of the inventive concept.

A computing system includes a microprocessor 2100, a user interface 2200, a modem 2300 such as a baseband chipset, a memory controller 2400, and a multi-bit memory device 2500 as a storage media. The multi-bit memory device 2500 may be configured identically with that illustrated in FIG. 2. This means that a size of a buffer memory included in the memory controller 2400 can be reduced. Further, the memory controller 2400 may control the multi-bit memory device 2500 according to a program operation described in FIGS. 3 to 21. N-bit data (N being 1 or more integer) processed/to be processed by the microprocessor 2100 is stored in the multi-bit memory device 2500 through the memory controller 2400. In the event that the computing system is a mobile device, a battery 2600 is further included in the computing system to supply an operating voltage thereto. Although not illustrated in FIG. 23, the computing system further comprises an application chipset, a camera image processor (CIS), a mobile DRAM, and the like.

Figure 24:
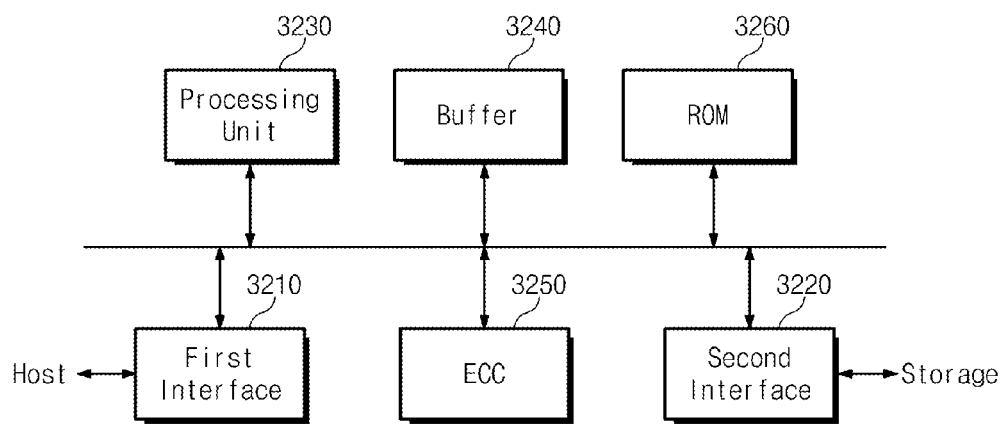
FIG. 24 is a block diagram showing a memory controller according to an exemplary embodiment of the inventive concept.

FIG. 24 is a block diagram showing a memory controller according to an exemplary embodiment of the inventive concept.

Referring to FIG. 24, a controller may be configured to store data in a storage media and read data from the storage media. The controller may include the first interface 3210, the second interface 3220, a processing unit 3230, a buffer memory 3240, an error control unit 3250, and ROM 3260. The memory controller in FIG. 24 may be applied to a system illustrated in FIG. 2 or 23.

The first interface 3120 may be configured to interface with an external device (for example, a host), and the second interface 3220 may be configured to interface with the storage media illustrated in FIG. 2 or 23. The processing unit 3230 may be configured to control an overall operation of the controller. The processing unit 3230 may be configured to operate firmware such as Flash Translation Layer (FTL) stored in the ROM 3260. The buffer memory 3240 may be used to temporarily store data to be written in the storage media or data read out from the storage media. The ECC unit 3250 may be configured to encode data to be stored in the storage media and to decode data read from the storage media.

Figure 25:
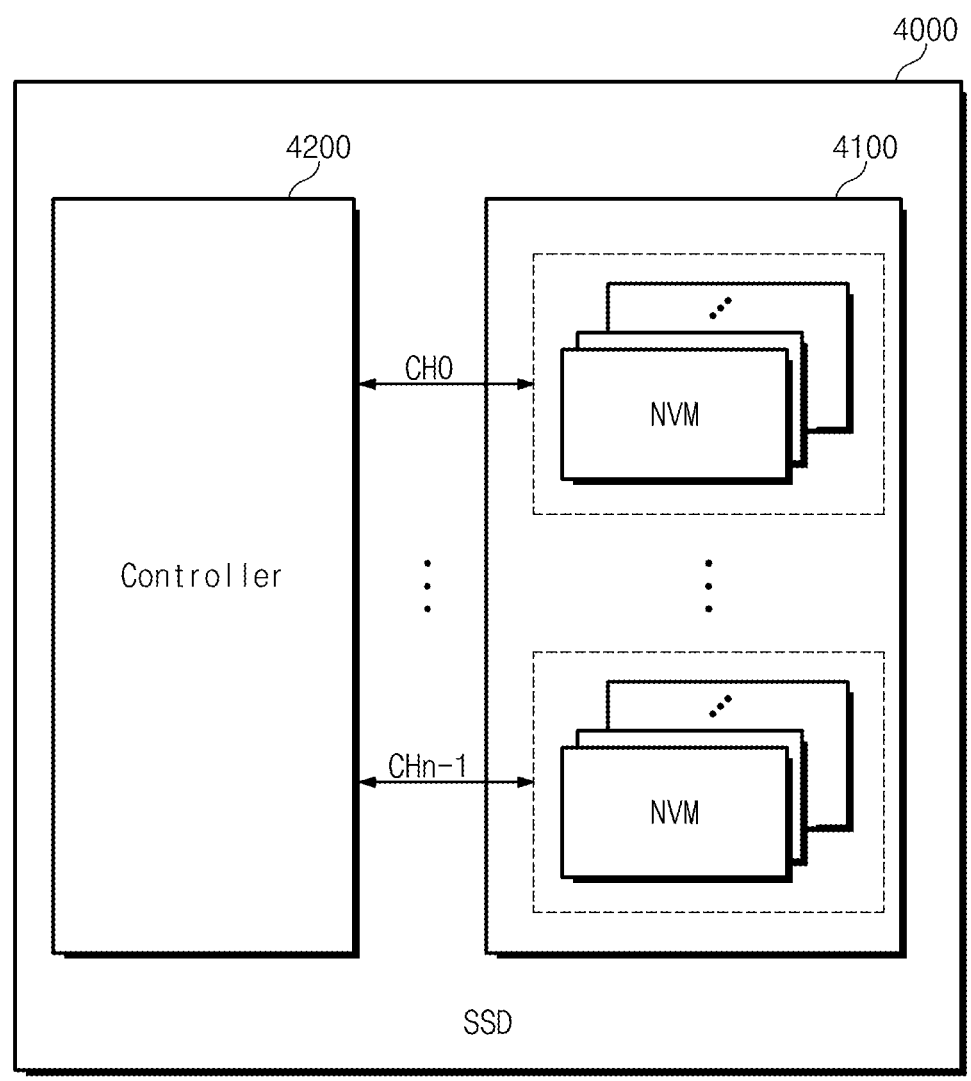
FIG. 25 is a block diagram showing a solid state drive according to exemplary embodiments of the inventive concept.

FIG. 25 is a block diagram showing a solid state drive according to exemplary embodiments of the inventive concept.

Referring to FIG. 25, a solid state drive (SSD) 4000 may comprise a storage media 4100 and a controller 4200. The storage media 4100 is connected with the controller 4200 via a plurality of channels, each of which is commonly connected with a plurality of non-volatile memories. Each non-volatile memory device may be formed of a memory described in FIG. 2. The controller 4200 may be configured to control the storage media 4100 according to any one of programming manners described with reference to FIGS. 3 to 21. This means that a size of a buffer memory included in the controller 4200 can be reduced.

Figure 26:
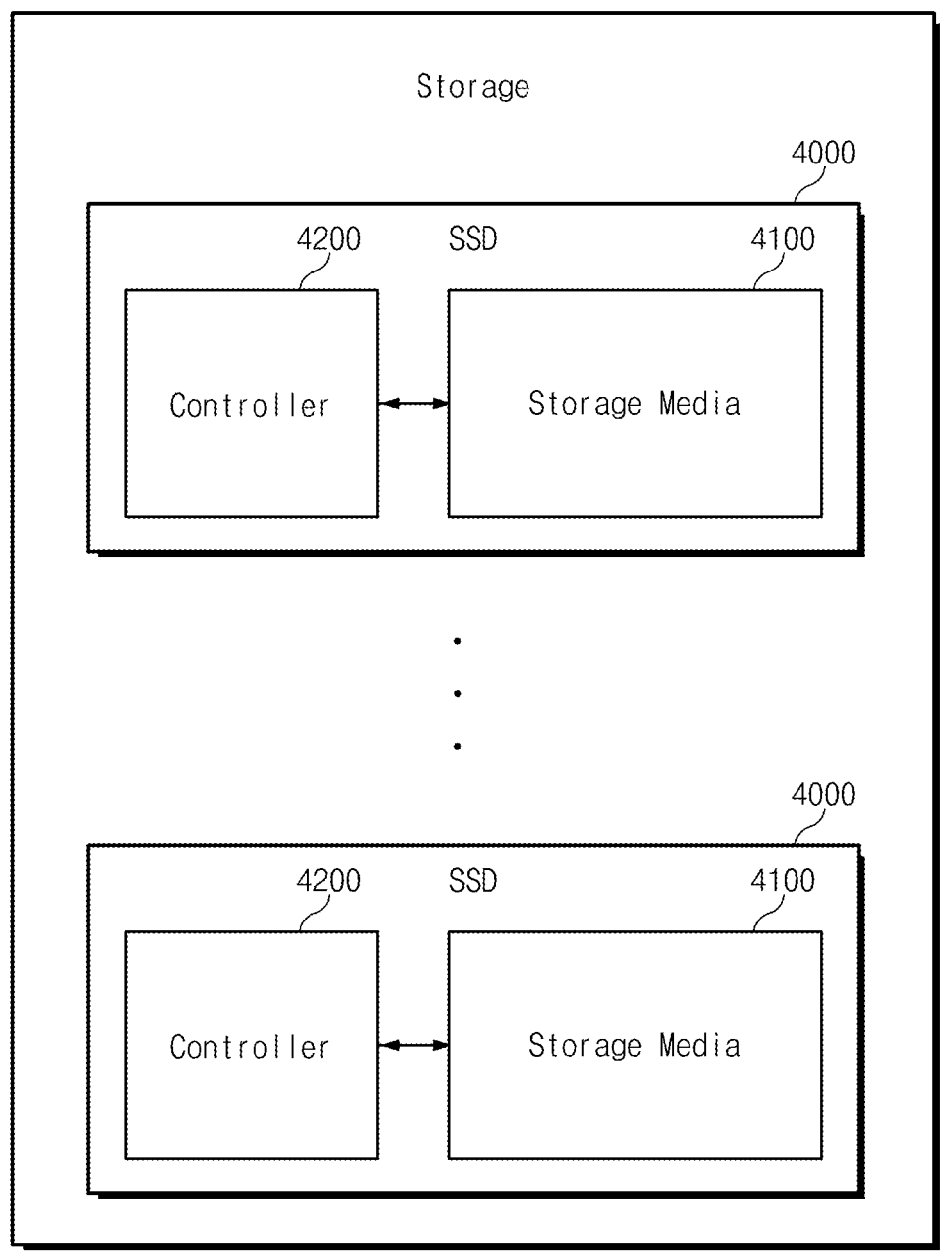
FIG. 26 is a block diagram showing a storage using a solid state drive in FIG. 25.
Figure 27:
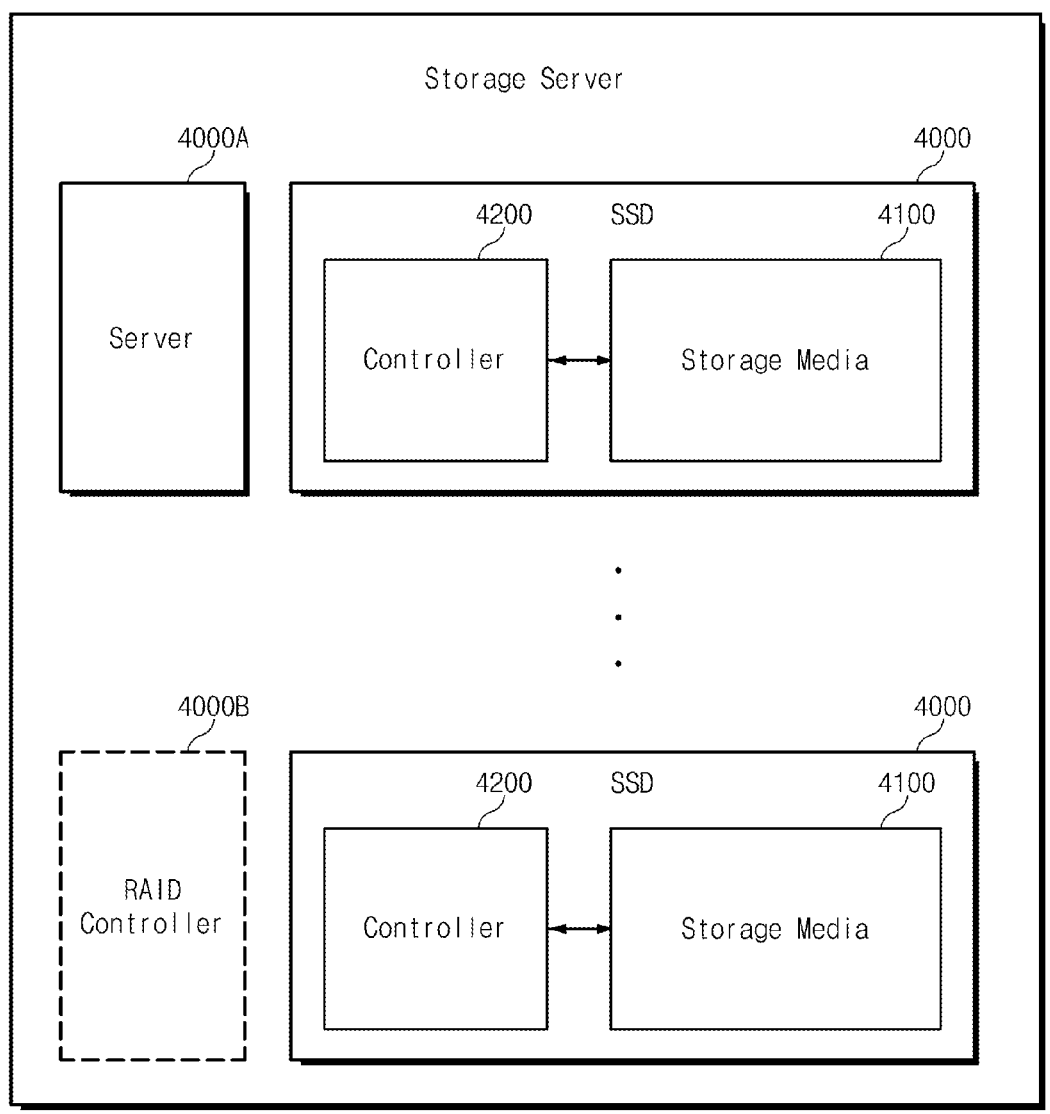
FIG. 27 is a block diagram showing a storage server using a solid state drive in FIG. 25.

FIG. 26 is a block diagram showing a storage device using a solid state drive in FIG. 25, and FIG. 27 is a block diagram showing a storage server using a solid state drive in FIG. 25.

An SSD 4000 according to an exemplary embodiment of the inventive concept may be used to form the storage. As illustrated in FIG. 26, the storage includes a plurality of solid state drives 4000 which are configured the same as described in FIG. 25. An SSD 4000 according to an exemplary embodiment of the inventive concept is used to configure a storage sever. As illustrated in FIG. 27, a storage server includes a plurality of solid state drives 4000, which are configured the same as described in FIG. 25, and a server 4000A. Further, it is well comprehended that a well-known RAID (redundant array of independent discs) controller 4000B is provided in the storage server.

Figure 28:
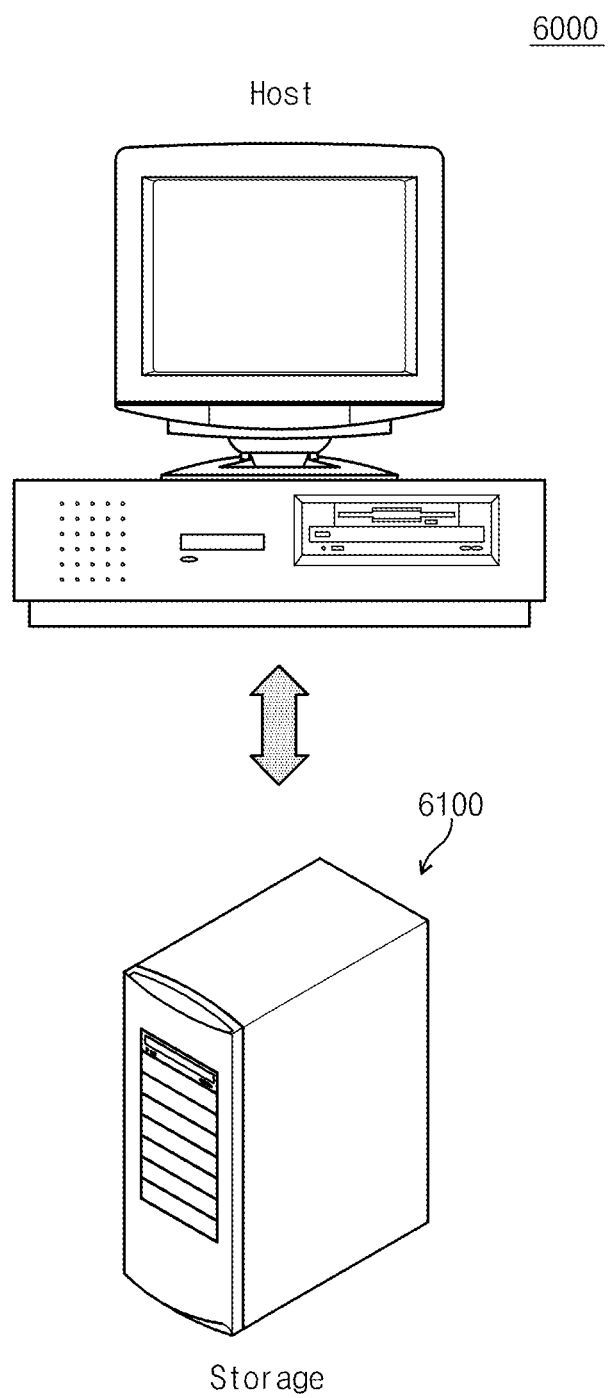
FIGS. 28 to 30 are diagrams showing systems to which a data storage device according to exemplary embodiments of the inventive concept is applied.
Figure 29:
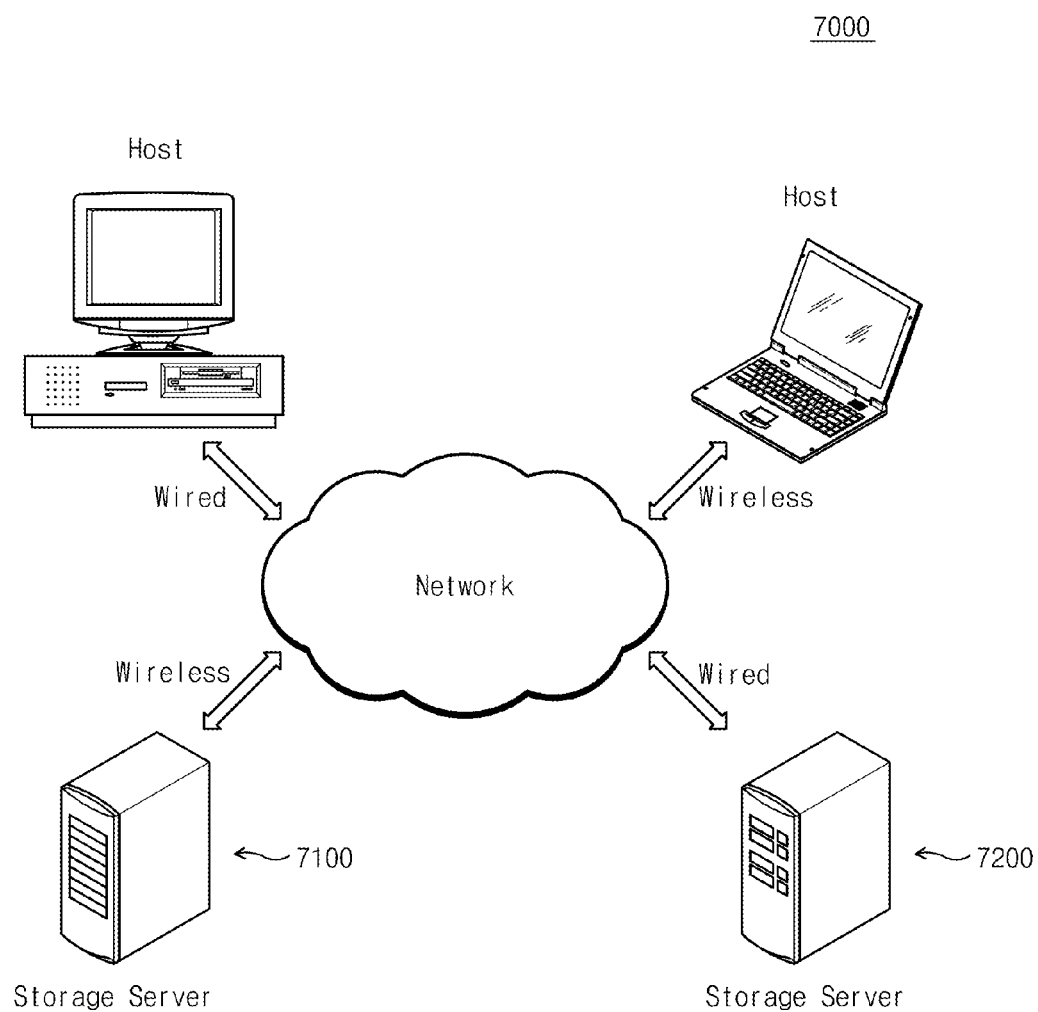
Figure 30:
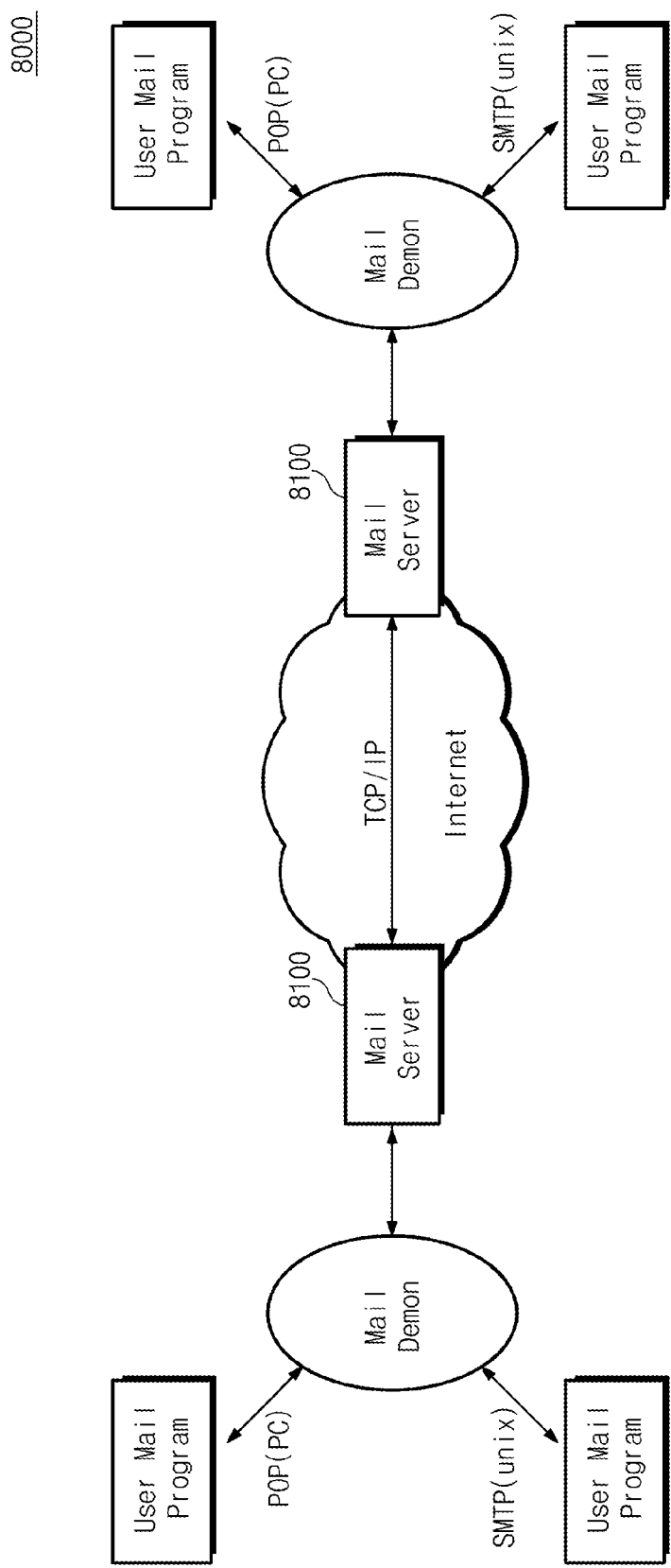

FIGS. 28 to 30 are diagrams showing systems to which a data storage device according to exemplary embodiments of the inventive concept is applied.

In the event that a solid state drive including a data storage device formed of a memory controller and a multi-bit memory device according to exemplary embodiments of the inventive concept is applied to the storage, as illustrated in FIG. 28, a system 6000 includes a storage 6100 which communicates with a host by a wire or wireless manner. In a case where a solid state drive including a data storage device according to exemplary embodiments of the inventive concept is applied to a storage server, as illustrated in FIG. 29, a system 7000 includes a storage servers 7100 and 7200 which communicate with a host by a wire or wireless manner. Further, as illustrated in FIG. 30, a solid state drive including a data storage device according to exemplary embodiments of the inventive concept can be applied to a mail server 8100.

Figure 31:
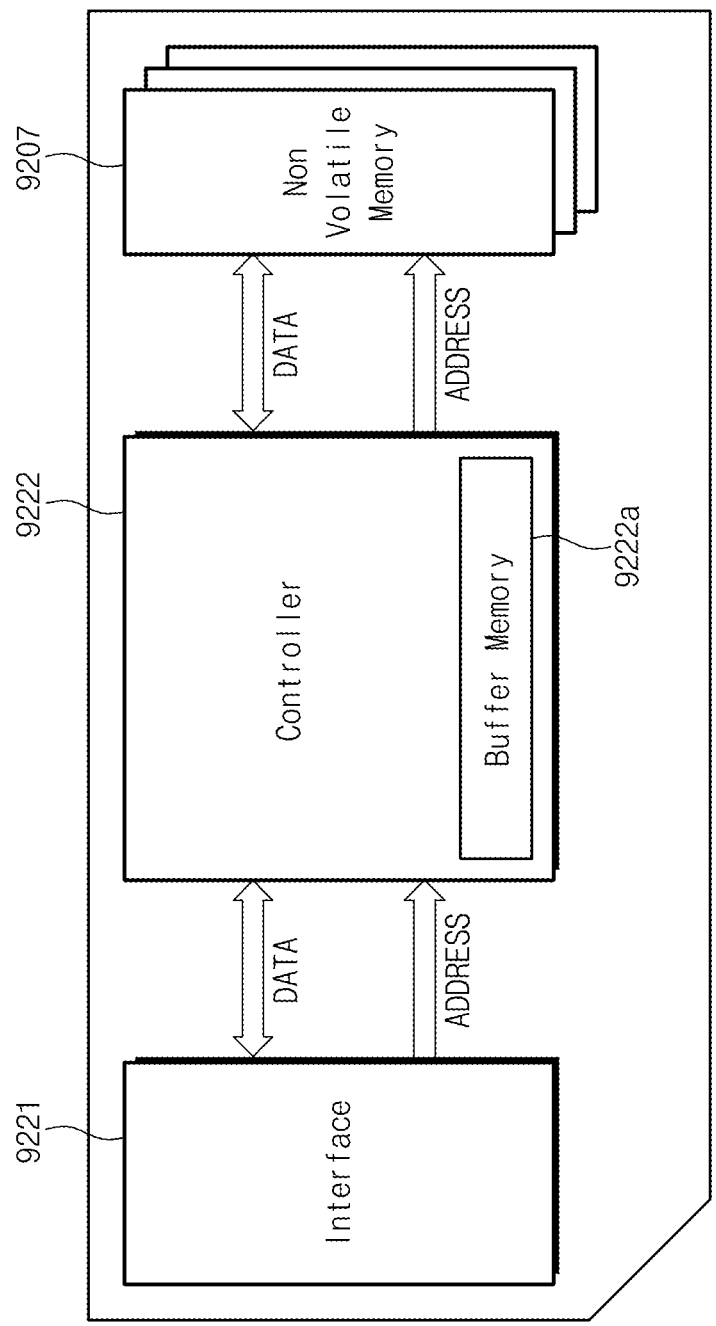
FIG. 31 is a block diagram illustrating a memory card according to embodiments of the inventive concept.

FIG. 31 is a block diagram illustrating a memory card according to embodiments of the inventive concept. A memory card, for example, may be an MMC card, an SD card, a multiuse card, a micro-SD card, a memory stick, a compact SD card, an ID card, a PCMCIA card, an SSD card, a chip-card, a smartcard, an USB card, or the like.

Referring to FIG. 31, the memory card may include an interface circuit 9221 for interfacing with an external device, a controller 9222 including a buffer memory and controlling an operation of the memory card, and at least one non-volatile memory device 9207 according to embodiments of the inventive concept. The controller 9222 may be a processor which is configured to control write and read operations of the non-volatile memory device 9207. In particular, the controller 9222 may be coupled with the non-volatile memory device 9207 and the interface circuit 2221 via a data bus and an address bus. The controller 9222 and the non-volatile memory device 9207 may correspond to a controller 200 and a multi-bit memory device 100 described in FIG. 2, respectively. The controller 9222 may be configured to control the non-volatile memory device 9207 according to any one of programming manners described with reference to FIGS. 3 to 21. This means that a size of a buffer memory included in the controller 9222 can be minimized.

Figure 32:
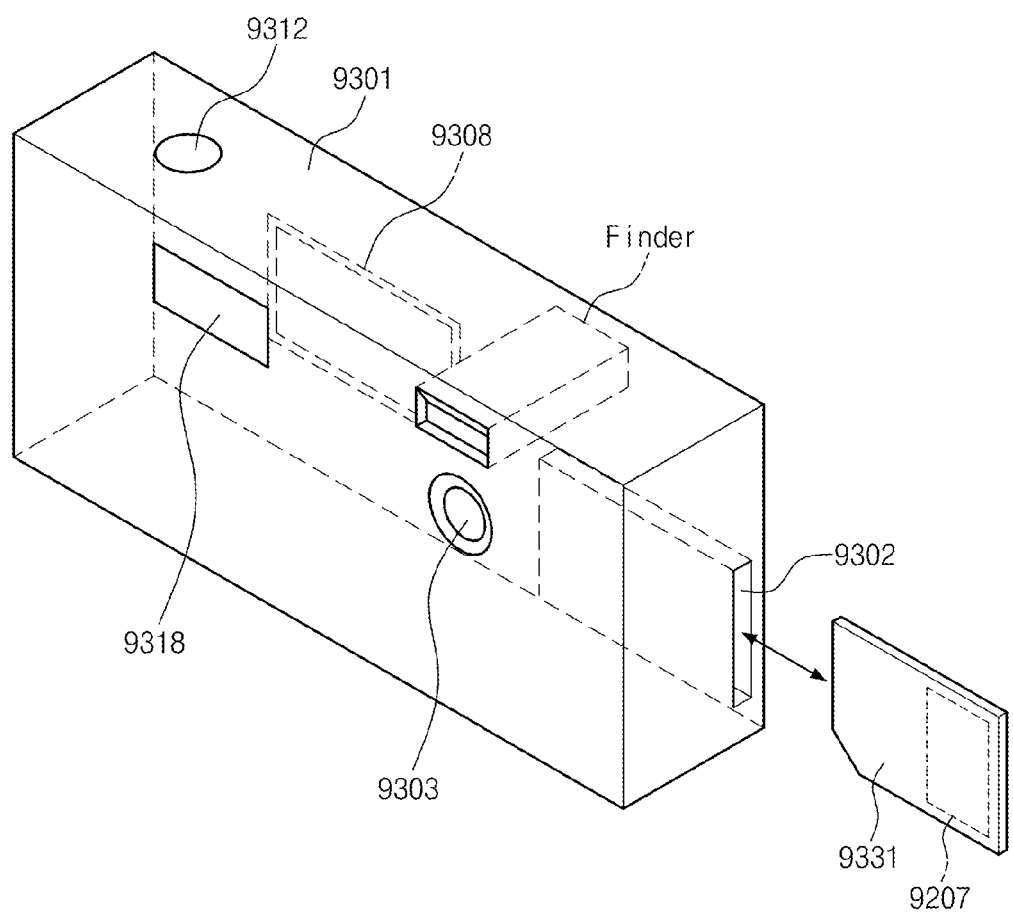
FIG. 32 is a block diagram illustrating a digital still camera according to embodiments of the inventive concept.

FIG. 32 is a block diagram illustrating a digital still camera according to embodiments of the inventive concept.

Referring to FIG. 32, a digital still camera may include a body 9301, a slot 9302, a lens 9303, a display circuit 9308, a shutter button 9312, a strobe 9318, and the like. In particular, a memory card 9331 may be inserted in the slot 9302 and include a memory controller 200 and a multi-bit memory device 100 described in FIG. 2. The memory controller in the memory card 9331 may be configured to control the multi-bit memory device therein according to any one of programming manners described with reference to FIGS. 3 to 21. This means that a size of a buffer memory included in the memory controller can be minimized.

If the memory card 9331 has a contact type, an electric circuit on a circuit board may be electrically contacted with the memory card 9331 when it is inserted in the slot 9302. In the event that the memory card 9331 has a non-contact type, an electric circuit on a circuit board may communicate with the memory card 9331 in a radio-frequency manner.

Figure 33:
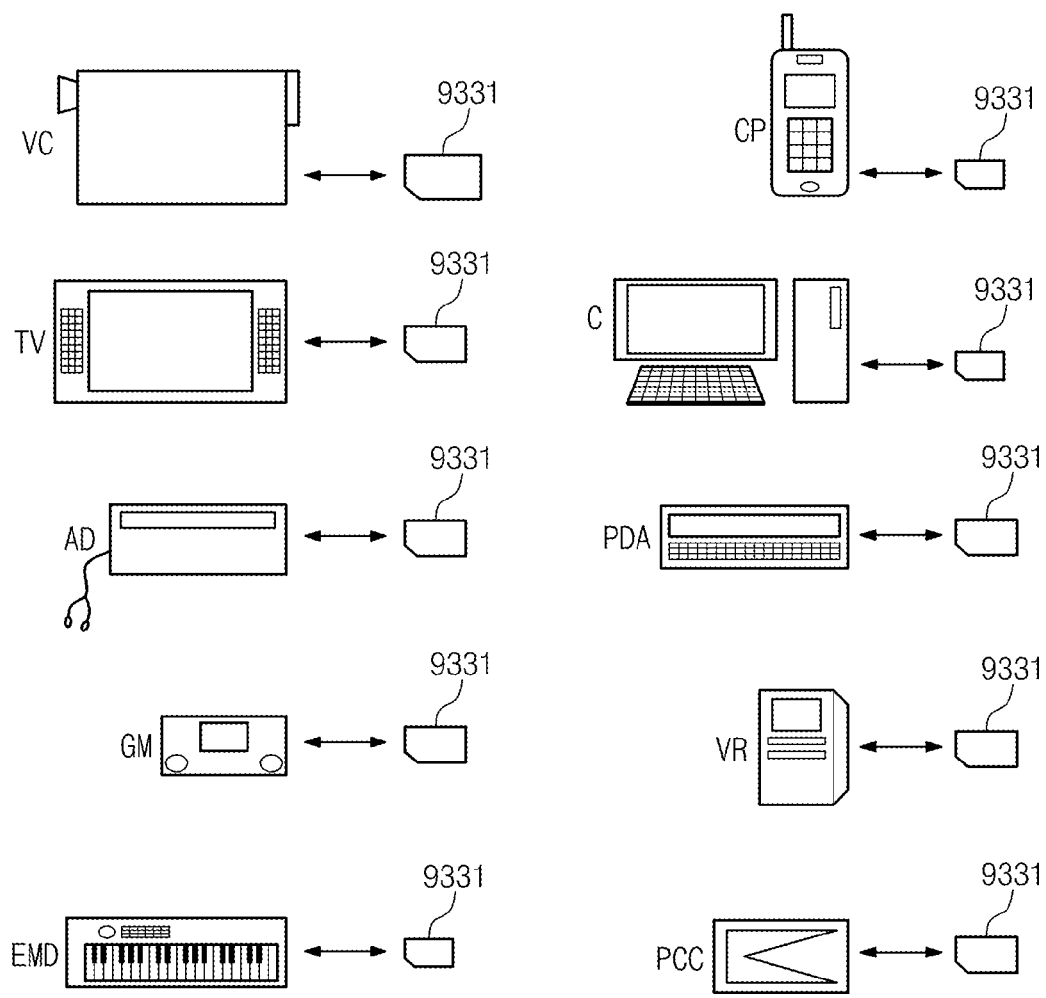
FIG. 33 is a diagram illustrating various systems to which a memory card in FIG. 31 is applied.

FIG. 33 is a diagram illustrating various systems to which a memory card in FIG. 32 is applied.

Referring to FIG. 33, a memory card 9331 may be applied to a video camera, a television, an audio device, a game machine, an electronic music device, a cellular phone, a computer, a Personal Digital Assistant (PDA), a voice recorder, a PC card, and the like.

In an exemplary embodiment of the inventive concept, memory cells can be formed of a variable resistance memory cell. An exemplary variable resistance memory cell and a memory device including the same are disclosed in U.S. Pat. No. 7,529,124, the entirety of which is incorporated by reference herein.

In another exemplary embodiment of the inventive concept, memory cells are formed of one of various cell structures having a charge storage layer. Cell structures having a charge storage layer include a charge trap flash structure using a charge trap layer, a stack flash structure in which arrays are stacked in a multiple layer, a source-drain free flash structure, a pin-type flash structure, etc.

A memory device having a charge trap flash structure as a charge storage layer is disclosed in U.S. Pat. No. 6,858,906 and U.S. Publication Nos. 2004/0169238 and 2006/0180851, the entireties of which are incorporated by reference herein. A source-drain free flash structure is KR Patent No. 673020, the entirety of which is incorporated by reference herein.

A non-volatile memory device and/or a memory controller according to the inventive concept may be packed using various types of packages. For example, A non-volatile memory device or a memory controller according to the inventive concept may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A data storage device comprising:
  a non-volatile memory device including a non-volatile memory cell array, the non-volatile memory cell array including a first region and a second region; and
  a memory controller configured to receive from an external device a current write command and current write data to be stored in accordance with the current write command, to judge whether a size of the current write data exceeds a reference size, and to execute the current write command such that the current write data is stored according to a judgment result,
  wherein when the current write data exceeds the reference size, the memory controller executes the current write command by controlling the non-volatile memory device such that a first portion of the current write data is stored via a main program operation in which the first portion of the current write data is stored in the second region without storing the first portion of the current write data in the first region, and such that a remaining second portion of the current write data is stored via a buffer program operation in which the second portion of the current write data is stored in the first region operating as a buffer for the second region, wherein when the current write data does not exceed the reference size, the memory controller executes the current write command by controlling the non-volatile memory device such that all of the current write data is stored via the buffer program operation in the first region, and wherein a number of bits stored per memory cell in the second region is greater than a number of bits stored per memory cell in the first region.

2. The data storage device of claim 1, wherein when the write data does not exceed the reference size, the memory controller controls the non-volatile memory device so as to perform the buffer memory operation in which, when data of a minimum program unit of the first region among the externally provided data is stored in a buffer memory of the memory controller, data stored in the buffer memory is stored in the first region.

3. The data storage device of claim 2, wherein when the write data does not exceed the reference size, the memory controller is configured to judge whether data of a minimum program unit of the second region is stored in the first region.

4. The data storage device of claim 3, wherein when the write data does not exceed the reference size, data of the minimum program unit of the second region is stored in the second region under a control of the memory controller when data of a minimum program unit of the second region is stored in the first region.

5. The data storage device of claim 3, wherein the minimum program unit of the first region is formed of a page, and the minimum program unit on of second region is formed of one or more pages according to a number of bits stored per memory cell.

6. The data storage device of claim 1, wherein when the write data exceeds the reference size, the main program operation on the second region is executed according to a reprogram operation including a 1-step program operation, a coarse program operation, and a fine program operation, based on data stored in a buffer memory of the memory controller.

7. The data storage device of claim 1, wherein the first region is formed of memory cells each storing single-bit data and the second region is formed of memory cells each storing multi-bit data.

8. The data storage device of claim 1, wherein the first region and the second region are formed of memory cells each storing multi-bit data.

9. The data storage device of claim 1, wherein the reference size corresponds to a size of at least one memory block of the memory cell array.

10. The data storage device of claim 9, wherein the first portion of the write data corresponds to a quotient obtained by dividing the write data by a size of the at least one memory block.

11. The data storage device of claim 10, wherein the second portion of the write data corresponds to a remainder obtained by dividing the write data by a size of the at least one memory block.

12. The data storage device of claim 1, wherein the memory controller comprises a buffer memory for temporarily storing the write data.

13. The data storage device of claim 12, wherein when the write data exceeds the reference size, the main program operation on the second region is made according to a reprogram operation including a 1-step program operation, a coarse program operation, and a fine program operation, based on data stored in the buffer memory.

14. A system comprising a host device and a data storage device operatively coupled to the host device, the data storage device comprising:

a non-volatile memory device including a non-volatile memory cell array, the non-volatile memory cell array including a first region and a second region; and a memory controller configured to receive from the host device a current write command and current write data to be stored in accordance with the current write command, to judge whether a size of the current write data exceeds a reference size, and to execute the current write command such that the current write data is stored according to a judgment result, wherein when the current write data exceeds the reference size, the memory controller executes the current write command by controlling the non-volatile memory device such that a first portion of the current write data is stored via a main program operation in which the first portion of the current write data is stored in the second region without storing the first portion of the current write data in the first region, and such that a remaining second portion of the current write data is stored via a buffer program operation in which the second portion of the current write data is stored in the first region operating as a buffer for the second region, wherein when the current write data does not exceed the reference size, the memory controller executes the current write command by controlling the non-volatile memory device such that all of the current write data is stored via the buffer program operation in the first region, and wherein a number of bits stored per memory cell in the second region is greater than a number of bits stored per memory cell in the first region.

15. The system of claim 14, wherein the data storage device is a solid state drive (SSD).

16. The system of claim 14, wherein the first and second regions are logically defined according to address mapping of the memory controller.

17. The system of claim 16, wherein the first and second regions are contained in respectively different NAND flash memory chips.

18. The system of claim 16, wherein the first and second regions are contained in a same NAND flash memory chip.

* * * * *